United States Patent [19]
Butterfield

[11] Patent Number: 6,135,928
[45] Date of Patent: Oct. 24, 2000

[54] VIRTUAL REALITY EQUIPMENT

[76] Inventor: Anthony Butterfield, 3781 Torrey View Ct., San Diego, Calif. 92130

[21] Appl. No.: 09/378,452

[22] Filed: Aug. 20, 1999

[51] Int. Cl.[7] ................................................. A63B 22/00
[52] U.S. Cl. ............................................... 482/69; 482/66
[58] Field of Search ................................ 482/4, 8, 9, 51, 482/69, 70, 74, 148, 66

[56] References Cited

U.S. PATENT DOCUMENTS

| | | | |
|---|---|---|---|
| 4,458,895 | 7/1984 | Turcotte | 482/78 |
| 4,907,571 | 3/1990 | Futakami . | |
| 5,145,474 | 9/1992 | Moore | 482/51 |
| 5,372,561 | 12/1994 | Lynch | 482/54 |
| 5,562,572 | 10/1996 | Carmein . | |
| 5,577,981 | 11/1996 | Jarvik . | |
| 5,846,134 | 12/1998 | Latypov . | |
| 5,902,214 | 5/1999 | Makikawa et al. . | |

*Primary Examiner*—Glenn E. Richman

[57] ABSTRACT

An input system for a virtual reality application that allows for natural human locomotion, and method of using the same, consists of a sphere having a center and an exterior surface and a base support supporting the sphere on the base support. A low friction interface is formed between the base support and a portion of the exterior surface of the sphere. The low friction interface generally conforms to the portion of the exterior surface of the sphere and permits rotation of the sphere about the center of the sphere relative to the base support. A user support is rigidly secured above the sphere and supports a user on the exterior surface of the sphere and holds a center of mass of the user on a vertical axis passing through the sphere. And one or more sensors are coupled to the base support for detecting and measuring a movement of the sphere. Furthermore, a restraining harness is rotatably attached to the user support, wherein the restraining harness rotates about the vertical axis passing through the sphere. The restraining harness and user support are adapted to hold a user on the vertical axis passing through the sphere.

28 Claims, 11 Drawing Sheets

VIRTUAL REALITY EQUIPMENT

BACKGROUND OF THE INVENTION

The present invention relates computer games and simulations, and more particularly to computer games and simulations using virtual reality. Even more particularly, the present invention relates to a method and apparatus for immersion of a user into virtual reality allowing natural human locomotion.

Virtual reality is a computer-generated reality that creates an illusion in a user that the user is in an artificially created world (virtual world). Virtual reality may stimulate naturally occurring senses such as sight, sound, touch, and movement. Actions of the user are translated by the computer into inputs that effect the virtual environment in which the user is in.

A major limitation in virtual reality systems is an inability for the system to allow natural human locomotion. Navigation is typically experienced as a disembodied center of consciousness directed by pointing, other gestures or by manipulation of a joystick, trackball, mouse, or similar device. The user, through the use of a head mounted display, is provided sensory information that the user is moving, but the user is located in a virtual reality pod and does not physically move. Disadvantageously, this causes discomfort and nausea in some users.

Other virtual reality systems comprise a treadmill that is connected to a computer system. This treadmill approach is very similar to the virtual reality pods except that the user is allowed uni-directional movement only. The user can walk forward and the virtual reality will respond accordingly; however, the user is unable to move backwards or side to side. Again, such a system does not allow for natural human locomotion and causes disorientation and potentially nausea in some users.

Still other approaches, such as shown in U.S. Pat. No. 5,562,572 (Carmein), hereinafter referred to as the '572 patent, use a treadmill that is able to move in both forward and reverse directions, as well as move from left to right. The user walks in a desired direction while sensors are positioned to detect which direction the user has walked. These sensors respond to signals transmitted from devices attached to the user's hands, waist, etc. The treadmill is then moved in the appropriate directions to continually bring the user back to the center of the treadmill. Motors are used that move the treadmill forward or backwards and left or right. Thus, the treadmill system senses movement and then reacts by moving the treadmill in such a manner to reposition the user in the center of the treadmill. Disadvantageously, expensive motors are needed, and more importantly, the system must physically move the user resulting in a potentially "jerky" motion as the user is repositioned in the center of the treadmill. If the user moves too quickly, e.g. beyond the pace of a walk, the system may not react in time and the user may actually walk off of the treadmill or the system may attempt to quickly move the user back to the center of the treadmill and "jerk" the user. This motion again may cause disorientation and nausea in some users. Furthermore, if the user trips or loses his or her balance, the user is not prevented from falling. Falling and loss of balance can occur is such systems since the user can not actually "see" the physical treadmill, only the virtual world presented. Thus, if the user experiences loss of balance, the user has difficult time recovering balance and may fall.

Yet another prior art approach, such as shown in U.S. Pat. No. 5,846,134 (Latypov), hereinafter referred to as the '134 patent, is for a user to be immersed inside of a large hollow sphere, for example 20 to 30 feet in diameter. The user is able to move in any direction; however, when the user begins to move from the center of the inside of the sphere, the user is essentially moving uphill, i.e. up the inside of the sphere. When the user reaches a certain point "up" the inside curvature of the sphere, the force of gravity or the use of a motor forces the sphere to rotate so that the user is again near the very bottom curve of the sphere. If the user moves too quickly in any direction, the sphere may not move fast enough to keep up and the user will have to stop or slow down so that the sphere will rotate enough to level the walking surface. Motors can be used to assist in turning the sphere; however, the motors must be precisely synchronized with the movement of the user inside in order to turn on and off depending on the velocity and direction of the user. It is difficult to start and stop the movement of the sphere using the motors especially if the user makes quick movements or changes velocity or direction. Additionally, in such a system, the user is not prevented from falling resulting from tripping or loss of balance as the user is walking "up" the inside of the sphere. Loss of balance is a problematic since the user wears a head mounted display and actually can't see the moving curved interior surface of the sphere. Disadvantageously, such a system requires expensive motors and sensing equipment and the processing demands are increased in order to translate the movement of the user into the virtual world. Disadvantageously, such a system would also require tremendous physical space to contain the large hollow sphere that may be up 20 to 30 feet in diameter, and the necessary supports and motors that are needed to support and turn the large hollow sphere.

Furthermore, in the described prior art systems, when a user encounters a barrier, e.g. a wall, within the virtual world provided, the user can simply "walk" right through barrier and the user does "feel" the barrier. Thus, conventional virtual reality equipment does not accurately simulate barriers.

SUMMARY OF THE INVENTION

The present invention advantageously addresses the needs above as well as other needs by providing an apparatus for immersion of a user into a virtual reality that allows for natural human locomotion while at the same time preventing the user from injury.

In one embodiment, the invention can be characterized as An input system for a virtual reality application that includes a sphere having a center and an exterior surface. A base support supports the sphere on the base support. A low friction interface is formed between the base support and a portion of the exterior surface of the sphere. The low friction interface generally conforms to the portion of the exterior surface of the sphere and permits rotation of the sphere about the center of the sphere relative to the base support. A user support is rigidly secured above the sphere and supports a user on the exterior surface of the sphere and holds a center of mass of the user on a vertical axis passing through the sphere. And one or more sensors are coupled to the base support to detect and measure a movement of the sphere.

In another embodiment, the invention can be characterized as an input system for a virtual reality application that includes a sphere having a center and an exterior surface. Support means including rotation means support the sphere. The rotation means contact the exterior surface of the sphere and permit rotation of the sphere about the center. User support means are rigidly secured above the sphere and support a user on the exterior surface of the sphere and hold a center of mass of the user on a vertical axis passing through the sphere. And sensor means are coupled to the support means to detect and measure a movement of the sphere.

In a further embodiment, the invention can be characterized as a method of providing a virtual reality input including the steps: providing a sphere having a center and an exterior surface; providing a base support for supporting the sphere on the base support; providing a low friction interface formed between the base support and the exterior surface of the sphere, wherein the low friction interface generally conforms to a portion of the exterior surface of the sphere and permits rotation of the sphere about the center of the sphere relative to the base support; positioning a user above the exterior of the sphere such that the user stands upon the exterior of the sphere; supporting the user above the exterior of the sphere; maintaining a center of mass of the user on a vertical axis passing through the sphere, whereby preventing the user from moving off of the vertical axis; rotating the sphere in reaction to movements of the user; detecting the movement of the sphere; and measuring the movement of the sphere.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1A:
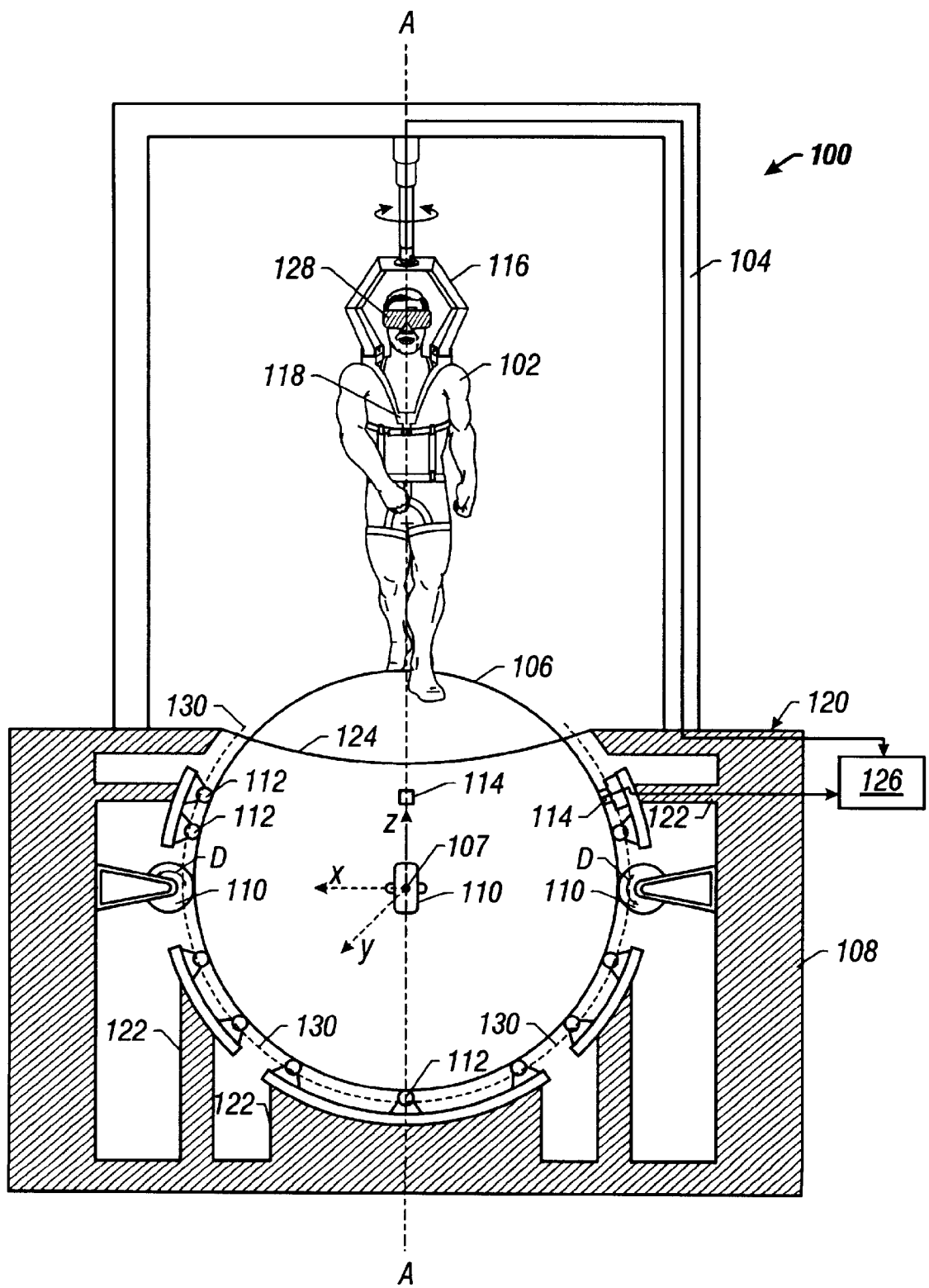
FIG. 1A is a front view of an apparatus for immersion into a virtual reality in accordance with the present invention.
Figure 1B:
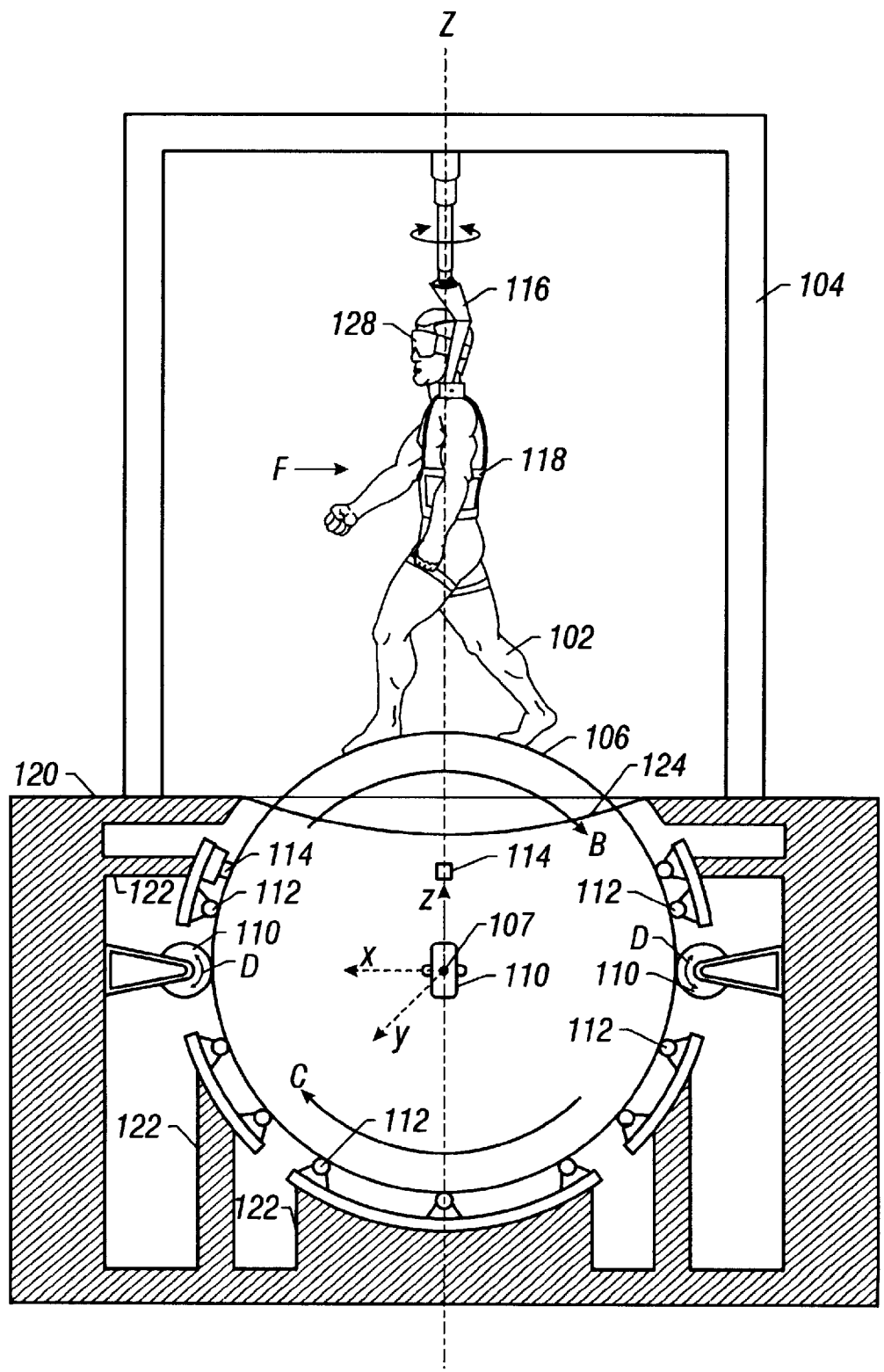
FIG. 1B is a side view of the apparatus shown in FIG. 1A demonstrating the motion of a user in accordance with the present invention.

Referring first to FIGS. 1A and 1B, a front view and side view, respectively, of an apparatus are shown for immersion of a user into a virtual reality in accordance with the present invention. The virtual reality system 100 includes the user 102, the stand 104, spherical treadmill 106 (referred hereinafter as a sphere), center 107, base support 108, base support stands 122, fixed axis wheels 110, casters 112, motion sensors 114, user support 116, restraining harness 118, the floor level 120, the floor opening 124, virtual reality processor 126, head mounted display 128, and a low friction interface 130.

This embodiment of the present invention provides an omni-directional treadmill that allows for natural human locomotion in a virtual reality environment without the use of motors or complex sensoring devices. The user, advantageously, is allowed to move all directions. The user can move along both the x-axis and y-axis (i.e. along the horizontal plane), and is allowed to turn about (i.e. rotate about) the z-axis (which is indicated by line A—A) as well as allowed limited movement up and down along the z-axis. The z-axis can be described as a vertical axis that passes through the center 107 of the sphere 106. Alternatively, in other embodiments, the z-axis or vertical axis does not have to pass through the center 107 of the sphere 106 (see FIG. 10).

The virtual reality system 100 serves as an input system to a virtual reality processor 126 that provides the virtual reality processor 126 with measurements of the direction and velocity of the rotation of the sphere 106 so that those movements can be input and translated by the virtual reality processor 126 into movements of the user within the virtual world. This departs from prior art systems that determine the "movements of the user" which are input into the virtual reality processor 126. In contrast, the present invention determines the "movements of the sphere" which are translated into the movements of the user within the virtual world. Thus, this embodiment does not require complex sensing equipment to measure the movements of the user, as the prior art references teach (e.g. the '134 patent and the '572 patent).

The virtual reality system 100 uses a sphere 106 having a center 107, which conceptually functions very similarly to a mouse pad or a track ball of a computer system. The sphere 106 is allowed to move in any direction within the space provided by the base support 108; however, as described below, rotational motion of the sphere about the z-axis is limited. The contact area formed between the sphere 106 and the base support 108 is designed to be almost frictionless and is referred to as a "low friction interface" 130 (illustrated as the dashed line 130 in FIG. 1A). In the embodiment shown in FIGS. 1A and 1B, this low friction interface 130 is formed by casters 112 positioned at the perimeter of the sphere 106 that allow for the sphere 106 to move easily in any direction. Additionally, fixed axis wheels 110 are used to reduce unintended spinning or rotation about the z-axis (discussed further below). Two motion sensors 114 are located in the base support 108 in order to sense the direction and velocity of the sphere's 106 rotation.

The sphere 106 is typically sunk below the floor level 120 or built onto a structure that has adequate room underneath to house the sphere 106 and the base support 108. The base support 108 has base support stands 122 that hold the casters 112 that support the sphere 106.

Figure 1C:
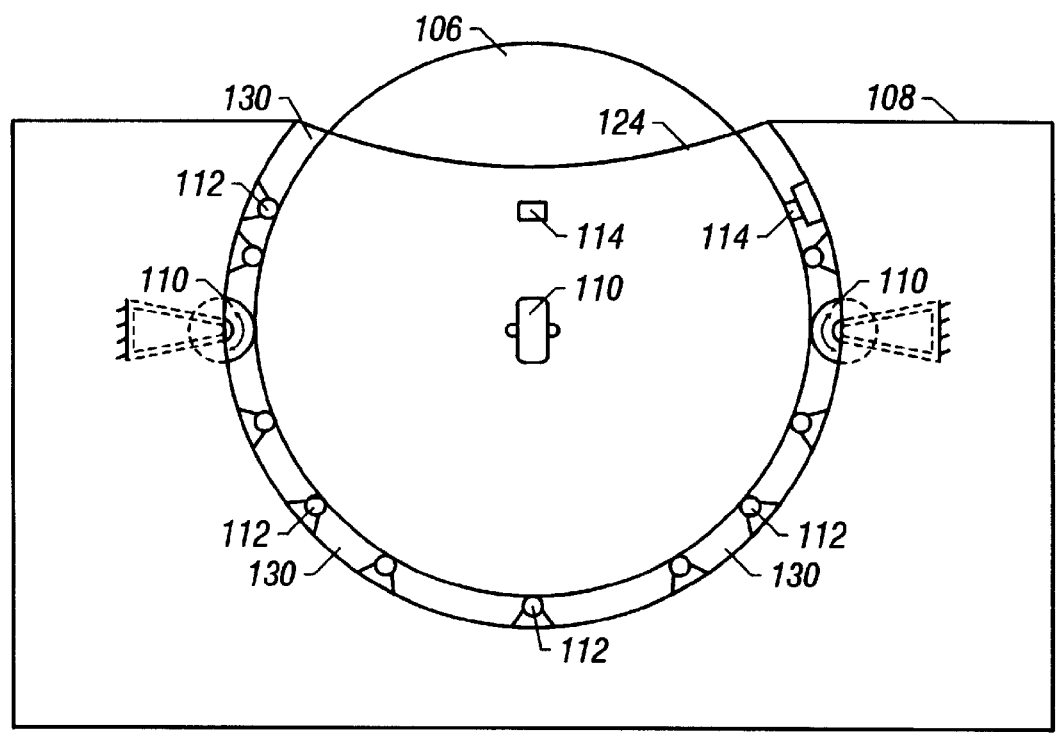
FIG. 1C is a view of one embodiment of the base support for forming the low friction interface shown in the apparatus of FIGS. 1A and 1B.

Alternatively, referring briefly to FIG. 1C, the base support 108 may be formed or molded, without the use of base support stands 122, to have a generally spherical interior shape slightly larger than the exterior shape of the sphere 106; thus, the base support stands 122 are not used. The casters 112 are be affixed to the interior spherical shape of the base support 108 in order to form the low friction interface 130. Also, the fixed axis wheels 110 are attached to the interior shape formed in the base support 108 in order to reduce any unintended rotation of the sphere 106 about the z-axis.

Advantageously, the virtual reality system can be designed so that the base support 108 and the majority of the sphere 106 are under the floor surface; thus hidden from the user's view. The exposed surface of the sphere 106, indicated by the surface line or floor opening 124, and the stand 104 will be visible to the user. Alternatively, the stand may be incorporated in the ceiling or similar support as described with reference to FIG. 12.

The user 102 of the virtual reality system 100 is held along the z-axis in a restraining harness 118 by the user support 116 and restraining harness 118. In other words, the user's center of mass is held on the z-axis by the user support 116 and the restraining harness 118. Thus, the user can not physically move off of the z-axis. In practice, as the user 102 begins to move in any direction, the force created by keeping the user on the z-axis and the force generated by the pressure of the user's foot as the user begins to step, pushes the sphere 106 in the opposite direction. Thus, as the user moves, the sphere moves oppositely to the user.

The movements of the sphere 106 about its center 107 are detected by the motion sensors 114, which are typical mouse type sensors used in computer systems, such as intellieye sensors, which are commercially available and known to the skilled artist. Such mouse type motion sensors are inexpensive in comparison to other sensing equipment, e.g. RF transmitters and sensors, shown in the prior art (e.g. see the '572 patent and the '134 patent). The motion sensors 114 detect the movement of the sphere 106 and send signals to the virtual reality processor 126 that translate these movements of the sphere 106 into the movements of the user 102 within the virtual world. Furthermore, it is advantageous to have two motion sensors 114 to compensate for any error resulting from unintended spinning of the sphere 106 about the z-axis (discussed with reference to FIG. 3). The motion sensors 114 are coupled to the virtual reality processor 126. In another embodiment, one motion sensor could be used if positioned at the very center of the bottom of the sphere 106 (i.e. the bottom pole or the "south" pole).

The virtual reality processor 126 is part of a computer system or computer network and typically contains an accelerator of three-dimensional graphics. The virtual reality processor 126 sends and receives signals to and from various devices in the virtual reality system 100, such as a head mounted display 128 as known in the art and commercially available. The head mounted display 128 provides the user 102 with visual immersion into the virtual reality world. The head mounted display 128 may be coupled to the virtual reality processor 126 via wires or signal lines that are fed through the stand 104 and the user support 116, or simply attached loosely to the head mounted display 128 in such a way as to not interfere with the movement of the user and the user support 116.

It is important that the center of mass of the user 102 is held on the z-axis (i.e. line A—A) or the vertical axis passing through the center 107 of the sphere 106. This provides the necessary forces to move the sphere 106 in any direction. This also prevents the user from stepping to the side and causing the sphere 106 to move in the same direction as the user. For example, as the user begins to step to the left side, the left foot of the user will slightly lift and the right foot of the user will push off of the sphere. Since the user is held on the z-axis, a force is generated between the right foot pushing against the sphere and the left side of the user's upper torso pushing against the restraining harness 118 which is holding the user in place. Therefore, the sphere 106 will roll to the right, as desired.

Furthermore, the user support 116 rotates axially about the z-axis so that the user may turn or twist in any direction. This is a departure from many prior art systems that only allow movement in one direction. This feature allows for a distinction between the user simply side stepping or turning to one side and then walking in that direction.

Thus, advantageously, the user can move in any direction and can even run. The diameter of the sphere 106 is great enough to allow for a full stride. For example, the sphere 106 may be 6–7 feet in diameter and the portion of the sphere above the base support 108, i.e. showing above the floor opening 124, may be about 3–4 feet in diameter. This allows for 3–4 feet of a stride; however, most users will only stride a couple feet. Additionally, while running, a user has a longer stride while the user will typically only have one foot on the ground (i.e. sphere 106) at any given instance, and thus, more than a 3–4 foot surface diameter is not needed. Therefore, from the sphere's perspective, the user does not appear to really have a stride at all since the user only has one foot on the sphere 106 at a time and the sphere 106 rotates at about the same speed as the user "pushing" it.

As an example, as the user begins to walk from a stand still, the lead foot lifts to step forward, while the back foot pushed off. The force generated by the back foot pushing off and the force of the front of the chest of the user 102 against the restraining harness 118 causes the sphere 106 to move backwards. This is illustrated in FIG. 1B in which the force "F" is generated on the user's chest when the user attempts to walk, and thus, the sphere 106 rotates about its center 107 oppositely (indicated by direction arrows "B" and "C"). As the user gains velocity, so does the sphere 106. As the user slows, the opposite forces are generated to slow the sphere down.

If the user were not held on the z-axis, the necessary forces may not be generated between the user 102 and the restraining harness 118 and the user 102 and the sphere 106. In fact, the user could cause the sphere 106 to rotate in the opposite direction intended by simply stepping too far forward and then the sphere 106 might roll forward instead of backward. In this example, the user would slip to the edge of the sphere 106 at the floor level 120.

Another advantage of the present embodiment is that the user 102 is held in place on the z-axis, preventing the user 102 from falling; thus, preventing injury to the user. There is some movement allowed along the z-axis in order to account for slight up and down movements so that the user will be sufficiently comfortable within the restraining harness 118. Thus, if the user were to lose balance, the user support 116 would essentially "catch" the user. This departs from some prior art systems in which the user can move in many directions, but is unsupported and could lose balance, especially if moving "up" the inside surface of a sphere (see the '134 patent), or being moved back to a central location by a motor driven treadmill. As described, in such applications, where the user actually can not physically see the treadmill or the interior surface of a hollow sphere, the user can experience loss of balance and fall. Thus, the present embodiment allows for natural movement while providing adequate support to protect the user from injury.

Furthermore, the amount of up and down movement along the z-axis allowed by the user support 116 may be varied in different embodiments of the present invention. For example, the user may be allowed to crouch down and crawl or may be allowed to jump relatively high. Such an embodiment would not necessarily provide the same safety functions as a user support 116 that allowed relatively minimal up and down movement along the z-axis. The details of how the user support 116 functions are further discussed with reference to FIG. 5.

The sphere 106 is lightweight and may vary in size; however, in the present embodiment, the sphere 106 should be between 6–7 feet in diameter, although the skilled artist could easily vary the size of the sphere. The sphere 106 can be a solid mass or can be hollow. The sphere is constructed from a lightweight material such as a polymer. Ideally, the sphere is an inflatable sphere, such as a vinyl inflatable sphere. Such inflatable vinyl spheres are commercially available to the skilled artist, for example, through School-Tech based in Ann Arbor, Mich. and Body Trends in Carpenteria, Calif. The vinyl inflatable sphere has an appropriate mass and density to equal human momentum when spinning while supporting the weight of the user. Additionally, the inflatable sphere 106 must be adequately inflated to support the user and minimize "bulging" of the sphere or "sinking" of the sphere 106 due to the mass of the user on the sphere. Typically, an inflatable sphere 106 may be inflated at a minimum of 0.5 atmospheres, preferably 1 atmosphere, although different materials may allow the sphere 106 to be inflated at a much higher atmosphere.

In the embodiment shown in FIGS. 1A and 1B, the low friction interface 130 formed between the sphere 106 and the base support 108 is created with the use of casters 112 at the interface between the sphere 106 and the base support 108. These casters 112 are rigidly attached to the base support 108 (or the base support stands 122) and contact at the exterior surface of the sphere 106. The number and positioning of the casters 112 may be varied depending on the characteristics of the sphere 106 and the support needed (refer to FIG. 2 for more details). For example, an inflatable sphere may require more casters 112 than a solid polymer sphere, since the solid sphere will not bulge to the degree that an inflatable sphere may. Fixed axis wheels 110 are also used, which only rotate back and forth in one direction (indicated by arrows "D") and are positioned variously around the equator of the sphere 106, ideally at 90 degree angles from each other. A minimum of three fixed wheels 110 spaced at 110 degrees is preferred. The fixed axis wheels 110 freely rotate and do not prevent motion transversely across the fixed axis wheel 110; however, their function is to provide a slight amount of friction or resistance transversely across the fixed axis wheel in order to minimize unintended spinning of the sphere 106 on the z-axis. Thus, the sphere 106 can move freely and with minimal friction while spinning (or rotation) of the sphere 106 about the z-axis is resisted.

Furthermore, the low friction interface 130 may be created between the base support 108 and the sphere 106 by positioning a low resistance fluid in the space or cavity formed between the base support 108 and the sphere 106. This is best illustrated in FIG. 1C, wherein the fluid would be positioned at the low friction interface 130. Such an embodiment would not require the use of casters 112 or fixed axis wheels 110, but could be adapted to use fixed axis wheels 110 or a similarly functioning device that may reduce unintentional rotation about the z-axis. By positioning the "fluid" between the base support 108 and the sphere 106, the low friction interface 130 is formed and the sphere 106 is allowed to rotate within the base support 108.

As shown, these embodiments of the present invention provides an elegant approach to provide for natural movement of a sphere 106, including running, without the use of motors. This departs from prior art methods that use motors to re-center the user on the treadmill (i.e. '572 patent) or speed up the re-centering of the user within a hollow sphere (i.e. the '134 patent). There is no need to re-center the user in this embodiment, since the user 102 is always centered. The use of lightweight materials and a near frictionless interface between the base support 108 and the sphere 106 provide for ease of motion and simplicity of design. Furthermore, the user is prevented from falling due to loss of balance that may potentially harm the user and damage expensive sensors and equipment.

Although, the embodiment shown in FIGS. 1A and 1B is designed to be used independently of motors, in an alternative embodiment, the fixed axis wheels 110 could be motorized, or at least coupled to a motor or similarly functioning device. Thus, the motors could be used to "speed" up the sphere 106 on its own, and in a sense, the user will be made to "walk faster". The motorized fixed axis wheels could be activated in response to an input device operated by the user to speed up or slow down the sphere 106. Alternatively, the motorized fixed axis wheels could be "set" at certain speeds in order to simulate an "exercise mode". In such motorized embodiments, the fixed axis wheels must contact the exterior of the sphere 106 tightly. This is so that motion of the fixed axis wheels will cause the desired motion of the sphere 106.

Figure 2:
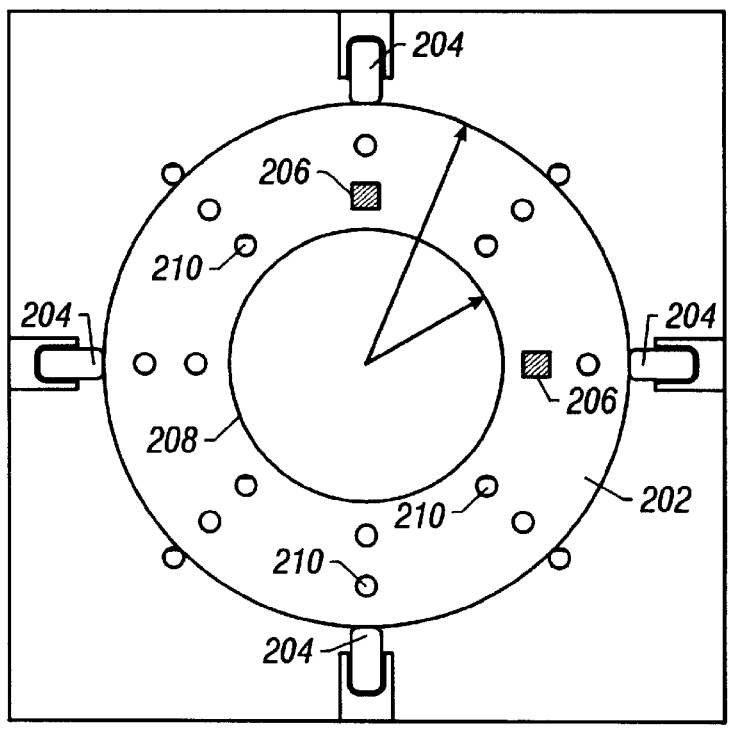
FIG. 2 is a top view of a spherical treadmill used in the apparatus shown in FIGS. 1A and 1B illustrating placement of casters and an exposed portion of the spherical treadmill.

Referring next to FIG. 2, a top view is shown of the sphere used in the embodiment shown in FIGS. 1A and 1B, illustrating the placement of casters and the exposed portion of the sphere. Shown are the sphere 202, fixed axis wheels 204, motion sensors 206, floor opening 208, and casters 210 (also referred to as ball transfers). The casters 210 are positioned uniformly at the perimeter of the sphere 202. The use of many casters 210 provides the low friction interface between the exterior of the sphere 202 and the contact surface between the sphere 202 and the base support which comprises the casters 210, fixed axis wheels 204 and motion sensors 206.

The casters 210 that form the low friction interface between the sphere and the base support are typically lubricated and sealed ball transfers as known in the art. The casters 210 or ball transfers rotate in any direction as well as provide support to hold the sphere 202 in position. The ball transfers may be screwed into the support stands of the base support or flange mounted as known in the art. Such ball transfers are readily available to the skilled artist and could comprise a variety of rigid materials. Alternatively, other types of devices may be used to function as the casters 210, such as a low friction fluid or liquid that is placed between the exterior of the sphere 202 and the base support (as shown in FIG. 1C) which allows the sphere 202 to slide or glide, thus, permitting rotation.

The fixed axis wheels 204 rotate back and forth in one direction (arrows "D" in FIGS. 1A and 1B), but are fixed about the axis normal to the surface of the sphere 202 to minimize unintended spinning of the sphere 202 axially to the z-axis. Thus, the fixed axis wheels 204 provide slight resistance of cross motion, but freely allow motion along a single axis. The fixed axis wheels 204 are typically located at 90 degree angles from each other at the mid-point or equator of the sphere 202.

In an alternative embodiment, the fixed axis wheels 204 are not used, only the casters 210 (ball transfers). However, in this embodiment, an error may be generated due to the possibility of unintentional spinning about the z-axis, which the fixed axis wheels 204 are designed to minimize as discussed above.

FIG. 2 also shows the floor opening 208 or opening in the base support. Thus, most of the sphere 202 is hidden from the user. i.e. below the level of the floor. The only portion visible is simply the uppermost portion of the sphere 202 that protrudes above the floor opening 208. Advantageously, this further prevents injury to a user if the user happened to become fall off the sphere 202 on the z-axis. The user would only slip to the floor, not off of the sphere and onto the base support.

Furthermore, the motion sensors 206 are located in the upper half (i.e. upper hemisphere) of the exterior of the sphere 202 and below the floor level. The motion sensors 206 are located at 90 degrees from the center of the sphere 202 from each other. The significance of this will be discussed with reference to FIG. 3. Alternatively, the motion sensors could be located in the lower hemisphere of the sphere 202. The motion sensors 206 may be located elsewhere at angles of other than 90 degrees with respect to each other and the center of the sphere; however, the velocity and direction determinations done by the virtual reality processor become more complex.

Figure 3:
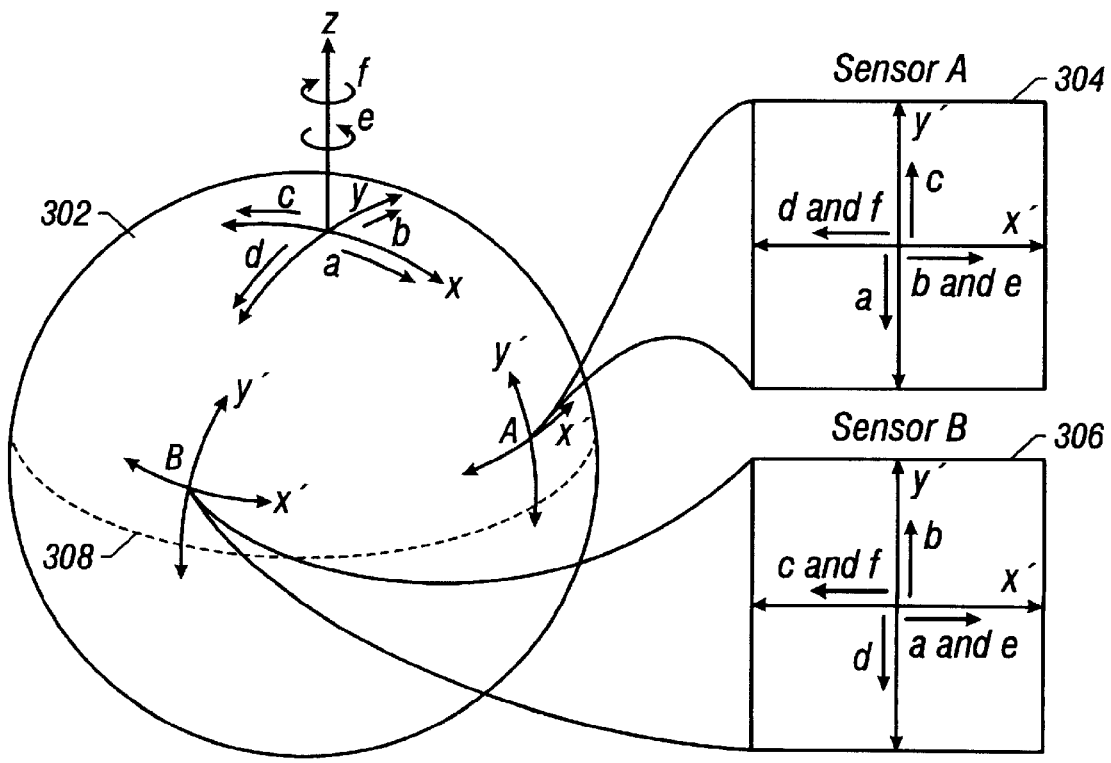
FIG. 3 is a representation of motion sensors employed at an exterior of the spherical treadmill and respective vectors generated by the various motions of the spherical treadmill in the apparatus shown in FIGS. 1A and 1B.

Referring next to FIG. 3, a diagram is shown illustrating the location of the motion sensors. Shown are the sphere 302, and two motion sensors 304 and 306. The motion sensors 304 and 306 are typically mouse type sensors used in computer systems, such as intellieye sensors which are optical sensors that takes pictures periodically (e.g. every msec). Other types of sensors may be employed as motion sensors, such as mechanical rollers that spin or move in response to the movements of the sphere 202. The amount and direction of the movements of the rollers are determined. Each motion sensor measures the direction and speed (i.e. measures the velocity vector) of movements of the sphere 302 which are sent to the virtual reality processor to translate these movements into velocity vectors approximating the position of the user within the virtual world. As mentioned above, it is advantageous to have two motion sensors to compensate for any error resulting from unintended spinning of the sphere 302 about the z-axis (see below). This unintended spinning about the z-axis is illustrated as arrows (or vectors) "e" and "f" and adversely effects the orientation of the user to the virtual reality processor.

Each motion sensor 304 (motion sensor A) and 306 (motion sensor B) measures motion of the sphere along the x-axis and y-axis shown as vectors "a", "b", "c", and "d" in FIG. 3. For example, the "a" vector represents positive motion of the sphere in the x direction while the "b" vector represents positive motion of the sphere in the y direction. Thus, motion sensors 304 and 306 each measure these motions as x' and y' movements. Unintentional spinning about the z axis in the "e" direction will be measured at motion sensor A 304 as positive motion in the x' direction and will be effected by vector "e" and vector "b". Similar vectors are determined for the various possibilities of movement of the sphere having components in the "a", "b", "c", and "d" directions. Thus, advantageously, both motion sensors 304 and 306 will independently measure the motion of the sphere 302 in the respective directions (i.e. each motion sensor 304 and 306 will measure motion in x' and y' directions). Two motion sensors are needed to account for unintentional spinning since each motion sensor outputs 2 independent measurements (both "x'" and "y'" directions). The system requires at least 3 independent measurements in order to account for any resulting error. Having two motion sensors 304 and 306, there are four independent measurements.

Any unintended spinning about the z-axis (i.e. "e" and "f") can be determined and accounted for by coordinating the measurements of the two motion sensors 304 and 306 which give the degree of rotation of the sphere with the degree of rotation measured by the compass in the head mounted display. The degree of rotation of the sphere 302 should be subtracted from the degree of rotation of the user (measured via the head mounted display). For example, if the user turns such that the head mounted display measures a degree rotation of +80° in a direction and the sphere spins −10° in the other direction, then the virtual reality processor should compensate by displaying the user at a +90° turn in the direction (i.e. 80−(−10)=90).

The motion sensors 304 and 306 are ideally located at the exterior of the sphere 302 and in the upper half (i.e. upper hemisphere) of the sphere above the equator 308 at 90 degree angles from each other. Alternatively, the motion sensors 304 and 306 may be located at other locations on the sphere, such as on the lower half (i.e. lower hemisphere) of the sphere below the equator 308 or located on the equator 308 itself or at other than 90 degrees with respective to each other; however, depending upon the location of the motion sensors, the velocity and direction determinations of the sphere 302 will need to account for the change in position. Alternatively, one motion sensor may be located at the very bottom center (i.e. south pole) of the sphere 302; however, an error due to unintentional spinning, not corrected by the fixed axis wheels, about the z-axis would be present, since another motion sensor would not be used to detect any resulting error.

Given the x' and y' motions of the sphere 302 as measured by each motion sensor 304 and 306, the skilled artist could easily calculate the respective velocities in the respective directions of the sphere. Thus, the motion of the sphere can easily be translated into the motion (direction and speed) of the user within the virtual environment.

Figure 4:
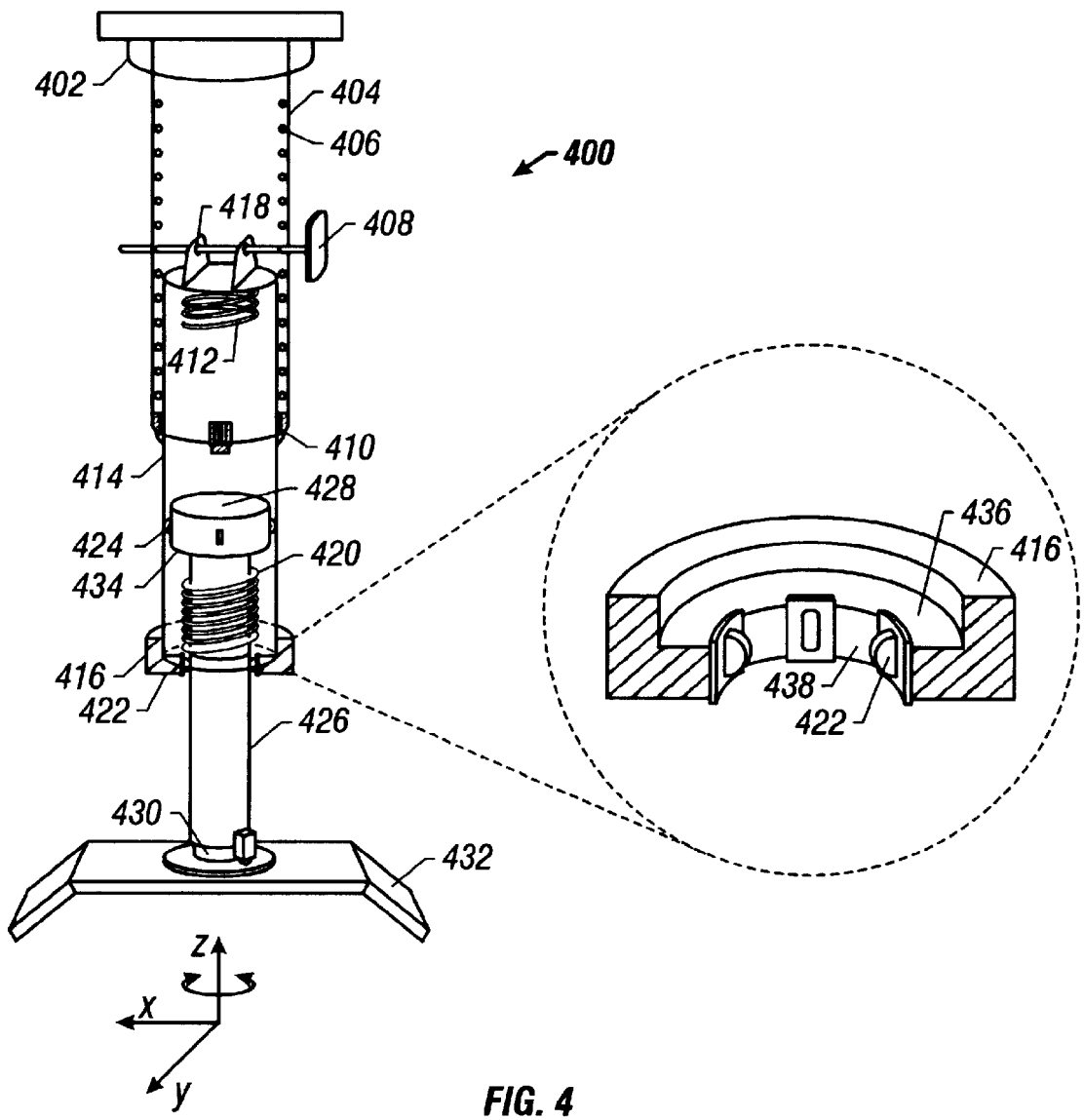
FIG. 4 is a diagram of a portion of a user support of the apparatus of FIGS. 1A and 1B that holds a user on the z-axis and allows axial movement (rotation) about the z-axis.

Referring next to FIG. 4, a diagram is shown of the user support that maintains the user on the z-axis and allows rotation about the z-axis. The user support 400 includes a stand joint 402, outer tube 404, sizing holes 406, lockpin 408, rubber bumpers 410, first spring 412, middle tube 414, first retaining cap 416, securing holes 418, second spring 420, first set of casters 422, second set of casters 424, inner tube 426, second retaining cap 428, rotatable joint 430, lower support 432, first retaining edge 436, and second retaining edge 434.

The user support 400 supports the user and maintains the user on the z-axis. A stand joint 402 is provided to connect the user support 400 to the stand or to the ceiling or similar support structure. The stand joint 402 must be rigidly attached to the stand or support. The outer tube 404 is held rigidly by the stand joint 402. The outer tube 404 is a hollow rigid material having sizing holes to adjust for different heights of different users. The middle tube 414 is a hollow rigid tube that slides into the outer tube 404. It may be made from any rigid material, such as a lightweight metal or plastic. The middle tube 414 is secured into the outer tube 404 using a lockpin 408, which is inserted through one of the sizing holes 406 in the outer tube 404 and securing holes 418 at the top of the middle tube 414. Thus, depending on which set of sizing holes 406 the lockpin 408 is inserted into, the height of the user support 400 can be altered to accommodate different users having different heights. Rubber bumpers 410 are used to stabilize the middle tube 414 inside the outer tube 404. These bumpers may be made out of any material; however, rubber or a slightly flexible polymer generally provides the best stabilization and cushioning. The middle tube 414 also has a first retaining cap 416 rigidly attached to the bottom of the middle tube 414. The first retaining cap 416 has a hole in the center that allows the inner tube 426 to slide through. The interior diameter of the hole formed in the first retaining cap 416 is slightly greater than the exterior diameter of the inner tube 426.

The inner tube 426 fits within the middle tube 414 and extends below the middle tube 414 to attach to the lower support 432. The inner tube 426 is made of a strong, lightweight material and may or may not be hollow. The top of the inner tube 426 has a second retaining cap 428 rigidly attached thereto that has a greater diameter than the diameter of the inner tube 426. A second spring 420 is positioned between the first retaining edge 436 formed in the first retaining cap 416 attached to the bottom of the middle tube 414 and the second retaining edge 434 of the second retaining cap 428 attached at the top of the inner tube 426. The first set of casters 422 are rigidly attached to the interior surface 438 of the hole of the first retaining cap 416. The first set of casters 422 may be mounted directly on the interior surface 438 or sunk into (as shown) the interior surface 438 such that the caster wheel touches the inner tube 426 and such that the spacing between the interior surface 438 of the first retaining cap 416 and the exterior surface of the inner tube 426 is minimized. The first set of casters 422 are wheel shaped, as opposed to ball shaped and serve two functions. First, they help stabilize the inner tube 426 within the middle tube 414 and, second, they allow movement up and down along the z-axis in a near frictionless manner, but not in other directions (i.e. x and y directions).

An additional set of casters, the second set of casters 424 (also wheel shaped casters as opposed to ball shaped), similar to the first set of casters 422, are rigidly attached to the exterior surface of the second retaining cap 428 between the interior diameter of the middle tube 414 and the first retaining cap 416. The second set of casters 424 stabilize the inner tube and, again, provide a near frictionless movement of the inner tube relative to the middle tube 414 up and down along the z-axis, while not allowing movement in the x and y directions (i.e. rotation about the z-axis).

Furthermore, there may be vertical grooves in the interior wall of the middle tube 414 that serve as a "track" or path for the second set of casters 424 further reducing the likelihood of rotation of the inner tube 426 about the z-axis. However, the grooves are typically unnecessary since the rotatable joint 430, discussed below, should virtually eliminate most rotational tendencies about the z-axis.

Note that there is a first spring 412 placed between the top interior of the middle tube 414 and the second retaining cap 428 of the middle tube 414. The first spring 412 and the second spring 420 limit movement up and down along the z-axis while cushioning the upward and downward movement. Thus, the user may be able to move or jump straight upward. The first spring 412 is strong enough to prevent the second retaining cap 428 from making contact with the top interior portion of the middle tube 414; thus, an uncomfortable jolt is avoided if the user jumps too high. Similarly, the second spring 420 cushions first retaining cap 416 from the second retaining cap 428. The first retaining cap 416 and the second retaining cap 428 prevent the inner tube 426 from sliding out of the middle tube 414, while the second spring 420 provides cushioning in the event of a fall. For example, the second spring 420 will allow the user to crouch slightly, depending on the chosen lengths, but should the user experience loss of balance and fall, the second spring 420, the first retaining cap 416, and the second retaining cap 428 essentially "catch" the user. The user is prevented from falling and the fall is cushioned. Thus, the first spring 412 and the second spring 420 act as shock absorbers. Any type of similar "shock absorber" device may be employed, such as a fluid system for example, as known in the art.

Furthermore, advantageously, the user support 400 rotates about the z-axis to allow the user to face or to move in any direction, not simply forward or backward. This is accomplished with a rotatable joint 430 attached between the inner tube 426 and the lower support 432. Thus, the lower support 432, and the restraining harness attached thereto rotate about the z-axis while the outer tube 404, middle tube 414, and inner tube 426 remaining stationary about the z-axis.

Furthermore, wires that electrically couple and send signals to and from the virtual reality processor and the head mounted display may be fed through user support 400, such that they extend through the stand, the outer tube 404, the middle tube 414, the inner tube 426, the rotatable joint 430 to then attach to the head mounted display. The wires are passed though a joint within the rotatable joint 430 such that the wires will not be excessively twisted due to the rotation of the lower support 432 in relation to the rest of the user support 400.

The user support may involve many variants of the design shown. The means to accomplish the user support should have the ability to telescope up and down along the z-axis while remaining rigidly remaining on the z-axis. The user support should accommodate users with different heights and be sufficiently strong to support the weight of the user support, the restraining harness, and the user. Furthermore, the user support should have a means to allow rotation of the restraining harness and thus, rotation of the user about the z-axis while maintaining the user (i.e. the center of mass of the user) on the z-axis. Additionally, the user support may have a motorized height adjustment, such that the user support may be forced to contract; thus, lifting the user off of the sphere for potential flight simulation. The present invention is not limited to the specific configuration, since many such configurations are possible and known within the art.

Figure 5:
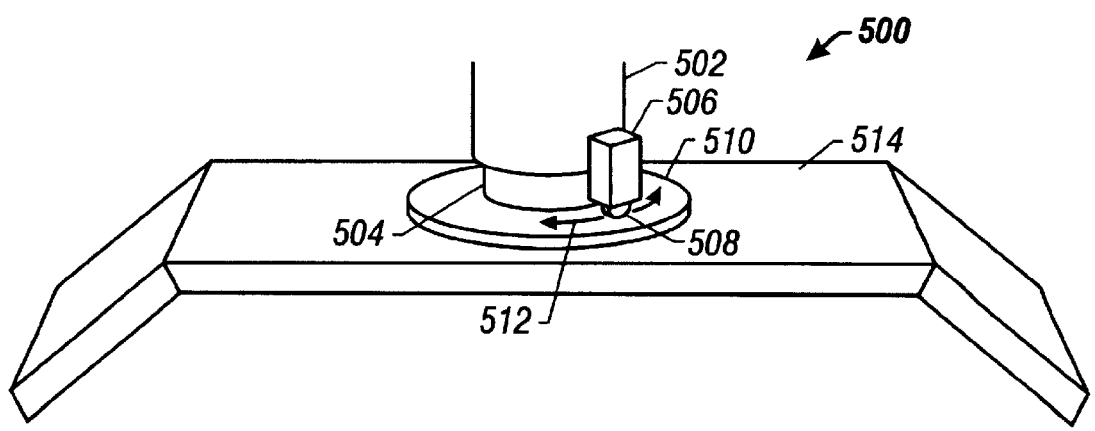
FIG. 5 is a diagram of a shoulder orientation sensor used in one embodiment of the user support shown in FIG. 4.

Referring next to FIG. 5, a diagram is shown illustrating a shoulder orientation sensor. Shown is the inner tube 502, rotatable joint 504, shoulder orientation sensor 506 including a wheel 508, disk 510, wheel path 512, and lower support 514.

The shoulder orientation sensor 506 sends a signal to the computer system that determines the orientation of the shoulders of the user. The signal may be sent through wires extending from the shoulder orientation sensor 506 through the user support to the virtual reality processor, along with the lines or wires attaching to the head mounted display. In practice, head mounted displays (not shown) often have compasses or other sensory devices that determine the direction that a user's head is facing. However, the user may be facing one direction and looking another direction, such as to the side. Thus, it is advantageous for the virtual reality system in modeling the body of the user within the virtual space to determine which direction the user is looking as well as which direction the user is facing. Using this embodiment, the user is able to look to the side while continuing to move forward; thus, a more accurate virtual reality will be created for the user.

The disk 510 is attached to the lower support 514 which attaches to the restraining harness. Thus, the disk 510 rotates as the lower support 514 and the restraining harness do. The shoulder orientation sensor 506 is attached to the exterior of the inner tube 502 slightly above the rotatable joint 504, such that the shoulder orientation sensor 506 does not move with the lower support 514 and the restraining harness. When the user rotates about the z-axis, the lower support 514 and the disk 510 rotate while the shoulder orientation sensor 506 remains stationary. However, the wheel 508 of the sensor contacts the wheel path 512 of the disk 510. The motion of the disk 510 and the contact between the wheel 508 and the wheel path 512 cause the wheel to turn. The distance that the wheel 508 moves is translated into an input signal which is sent to the virtual reality processor and; thus, the shoulder orientation of the user can easily be determined. The present embodiment is not limited to the above configuration. There may be many ways in which the skilled artist could determine the position of the user's shoulders.

Figure 6:
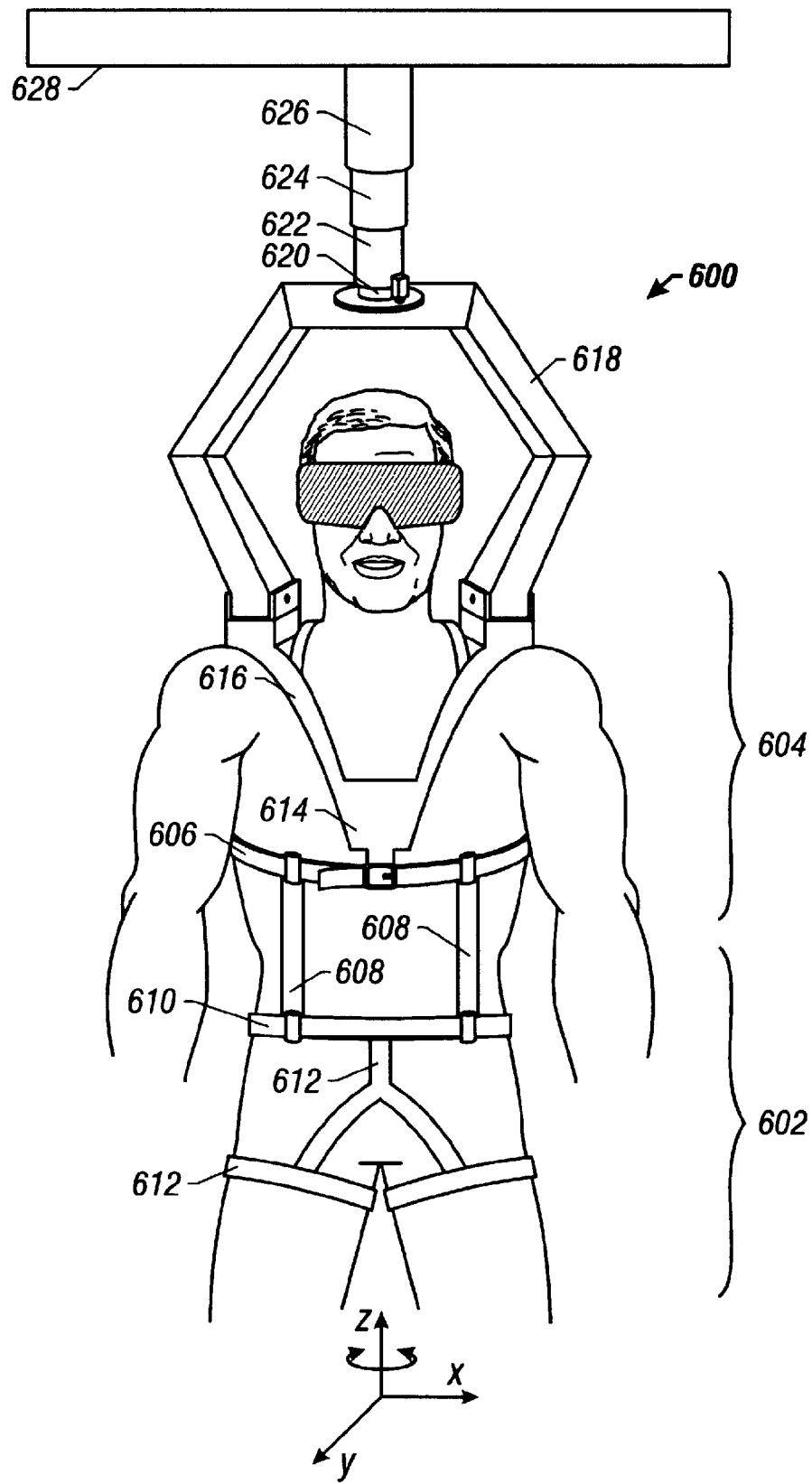
FIG. 6 is a diagram of one embodiment of a harness and restraining support used in conjunction with the user support of FIG. 4 to hold the user in position along the z-axis while allowing for rotation about the z-axis.

Referring next to FIG. 6, a diagram is shown of the harness and restraining device used to hold the user into position in the embodiment shown in FIGS. 1A and 1B. The restraining harness 600 includes the upper restraining harness 604, lower restraining harness 602, first belt 606, straps 608, second belt 610, lower harness 612, breast plate 614, and shoulder harness 616. Also shown are the lower user support 618, rotatable joint 620, inner tube 622, middle tube 624, outer tube 626, and the stand 628.

The upper restraining harness 604 is rigidly attached lower user support 618 which is attached to the rotatable joint 620 of the user support. The upper restraining harness 604, lower user support 618, and the rotatable joint 620 rotate axially about the z-axis. The upper restraining harness 604 is made of a strong rigid material. The lower part of the upper restraining harness 604 forms the breast plate 614 and attaches to a first belt 606. The upper portion of the upper harness 604 forms the shoulder harness 616. The shoulder harness 616 and the breast plate 614 are constructed of a rigid material, such as a metal or strong plastic so that it can withstand the pressure exerted by the user when the user pushes off of the sphere. Additionally, the shoulder harness 616 and the breast plate 614 should be padded for comfort to the user.

The first belt 606 is attached to the bottom of the breast plate 614 and is located slightly below the chest of the user. The first belt 606 attaches to the second belt 610 of the lower restraining harness 602 via straps 608. The second belt 610 is typically located at the waist of the user. The lower harness 612 of the lower restraining harness 602 wraps around each leg of the user and is similar to a standard climbing harness. The first belt 606 adjusts to snugly fit the user around the chest so that the breast plate 614 is snugly up against the chest of the user and the back of the user is snugly up against the back of the shoulder harness 616. The second belt 610 adjusts to snugly fit the user able the waist, and the straps 608 are adjustable depending on the height of the user. The first belt 606, second belt 610, straps 608, and lower harness 612 are typically made of a more flexible material, such as a nylon.

The restraining harness 600 is rigid from the stand 628, lower user support 618, shoulder harness 616, and breast plate 614; thus, the center of mass of the user is held on the z-axis. When the user tries to move in any direction, such as forwards, backwards, or side to side, the upper restraining harness 604, breast plate 614, and lower user support 618 remain stationary; thus, the force is exerted onto the sphere by the user's foot is amplified, allowing for ease in moving the sphere. Alternatively, the first belt 606 may be made rigid to further aid in holding the user on the z-axis in side to side motions.

Again, as can be seen, the user is allowed to rotate axially about the z-axis by the rotatable joint 620, while being held on the z-axis. Furthermore, the user is allowed some movement up and down along the z-axis. There are many possible configurations that could accomplish the same functions as the restraining harness 600 and the example provided is therefore, only one example of a device capable of holding the user on the z-axis, while allowing rotation about the z-axis. Additionally, the user is allowed to move up and down along the z-axis.

Figure 7C:
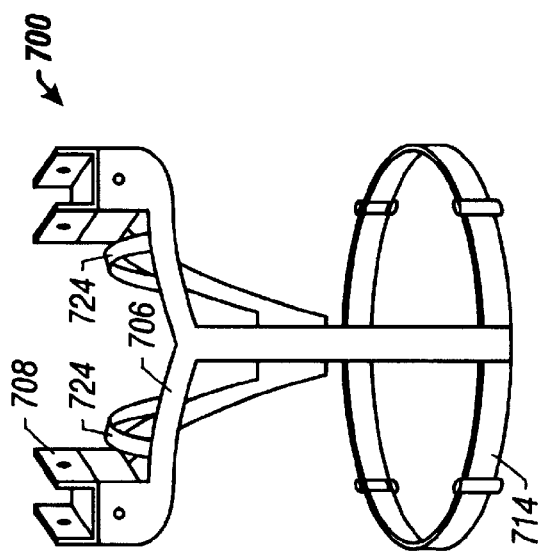
FIGS. 7A, 7B, and 7C are a front, side, and back view, respectively, of the shoulder and chest harness in FIG. 6.
Figure 7B:
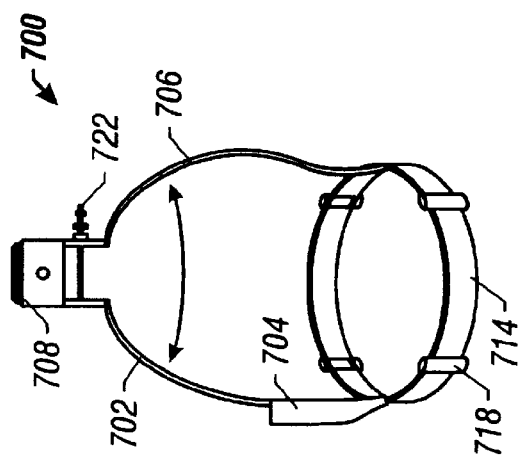
Figure 7A:
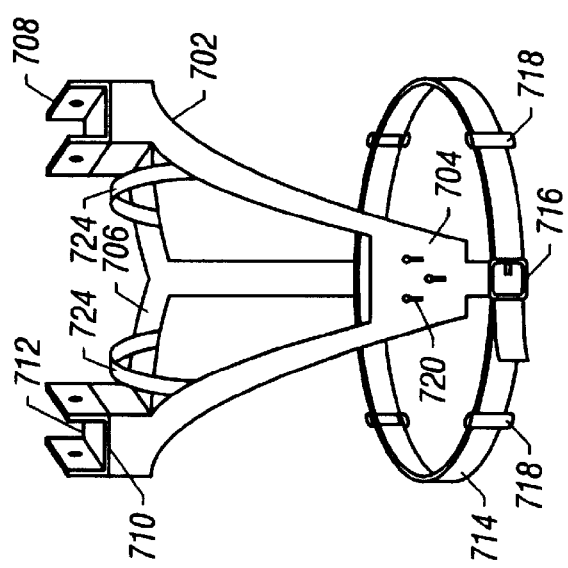

Referring next to FIGS. 7A, 7B, and 7C, a front, side, and back view, respectively, of the upper restraining harness used in the embodiment shown in FIG. 6 to keep the user positioned along the z-axis is shown. The upper restraining harness 700 includes the front piece 702, breast plate 704, back piece 706, lower user support attachment 708, front hinge 710, back hinge 712, first belt 714, buckle 716, strap attachment 718, breast plate holes 720, threaded bolt 722, and shoulder straps 724.

The upper restraining harness 700 is rigidly designed to hold the user on the z-axis. Thus, the upper restraining harness 700 attaches to the lower user support and is placed about the shoulders and chest of the user. The upper restraining harness 700 attaches to the lower user support via the lower user support attachment 708. In the embodiment shown, the lower user support attachment 708 has holes used to receive a pin or similar device to secure the upper restraining harness 700 to the lower user support. The front piece 702 and the back piece 706 may be adjusted to accommodate users having different chest sizes. This is accomplished with the use of a threaded bolt 722 for example. One threaded bolt 722 is placed through the back piece 706 into the back hinge 712 and tightened and then held in place using an appropriate locking device, such as a wing nut and rubber bumper.

Additionally, shoulder straps 724 are used in order to prevent the shoulders of the user from contacting the lower support attachment 708, the front hinge 710, and the back hinge 712. The shoulder straps 724 attached at one end to the front piece 702 and at the other end to the back piece 706. Thus, if the user moves vertically up very quickly, e.g. jumps, the user's shoulders will be prevented by the shoulder straps 724 from jarring loose from the restraining harness and contacting the connection to the lower user support 618, resulting in discomfort to the user. The shoulder straps 724 may be belts that may be fastened snugly on the user's shoulders or simply elastic straps. The shoulder straps 724 are best seen in FIGS. 7A and 7C.

The back piece 706 should flair out and contact the user against the user's back. The front piece 702 should flair out slightly and contact the user at the user's chest at the breast plate 704. The front piece 702, back piece 706, and breast plate 704 should be made of a rigid, strong material, yet should be padded for comfort to the user. Additionally, the upper restraining harness 700 could also be made into a variety of sizes and shapes to accommodate users that are too different in size to adjust for using one standard upper restraining harness. Furthermore, the front piece 702 and breast plate 704 could be specially designed for female, as well as male users.

The first belt 714 is adjustable using the buckle 716 and holes within the first belt (not shown). This ensures that the upper restraining harness 700 will snugly fit against the user's chest. The first belt 714 also has straps that attach to the second belt and lower harness.

The breast plate holes 720 allow attachment of input/output devices for user interaction with the virtual world. Devices, such as a small keypad controller, could be stored on the breast plate holes 720 until needed by the user.

Figure 8:
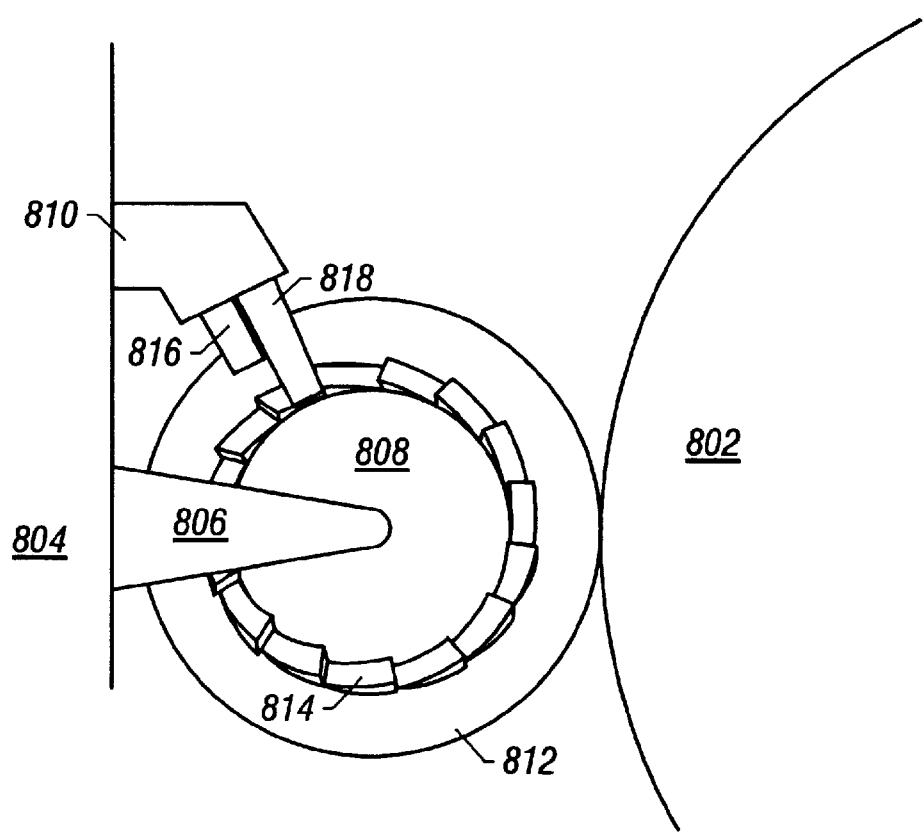
FIG. 8 is a diagram of a brake system used on fixed axis wheels in the apparatus of FIGS. 1A and 1B, including both bidirectional brakes and unidirectional brakes in order to simulate barriers in a virtual environment.

Referring next to FIG. 8, a diagram is shown another embodiment of the present invention in which a brake system used on the fixed axis wheels shown in FIGS. 1A and 1B, including both bidirectional brakes and unidirectional brakes in order to simulate barriers in the virtual environment. Shown is the sphere 802, base support 804, mounting brace 806, fixed axis wheel 808, brake arm 810, caster tread 812, unidirectional brake tread 814, bidirectional brake 816, and unidirectional brake 818.

As shown, the fixed axis wheel 808 contacts the exterior surface of the sphere 802. The fixed axis wheel 808 is attached to the base support 804 via the mounting brace 806. As described earlier, when the sphere 802 rotates, the fixed axis wheel 808 rotates opposite the direction of the sphere 802. The fixed axis wheel 808 only rolls back and forth in one direction. In the embodiment shown in FIG. 8, the virtual reality system uses a braking system in order to simulate barriers in the virtual space created for the user. In this embodiment, the fixed axis wheel 808 must be in close contact to the sphere 802. The braking system uses two different types of brakes. The brake arm 810 holds the two brakes in position about the fixed axis wheel 808.

The first brake, is the bidirectional brake 816, which is very similar in operation to that of a bicycle brake. Either the virtual reality processor activates the bidirectional brake 816 or the user does when the user is getting on and off of the apparatus. It is a clamp type brake that when activated, engages the caster tread 812 on the side of the fixed axis wheel 808 near its perimeter. This has the effect of braking the fixed axis wheel 808. This, in turn, brakes the sphere 802 since the fixed axis wheel 808 is no longer able to rotate. This bidirectional brake 816 stops the motion of the sphere 802 on both directions and may serve many functions in the virtual reality system. For example, all of the bidirectional brakes 816 of all of the fixed axis wheels could be engaged when the user is hooking up to or disconnecting from the system, so that the sphere 802 will not rotate until the user is ready. In this embodiment, the fixed axis wheel 808 must be in close contact with the sphere. In other words, the fixed axis wheel 808 exerts a slight pressure on the sphere 802.

Alternatively, the bidirectional brakes 816 may be used to simulate "uphill" movement. The bidirectional brakes 816 are applied in such a manner as to have generally a braking effect, without causing the sphere 802 to stop moving in a specific direction. This would make it slightly more difficult for the user to move the sphere in the specific direction. The added resistance could be used in combination with the virtual space simulating an uphill slope to make the user "feel" more like the user is really walking uphill, since the user has to exert more force on the sphere 802 to walk due to the resistance of sphere.

The second type of brake is the unidirectional brake 818, which is also similar to a bicycle brake. However, the brake pad of the unidirectional brake 818 is angled to match an angled groove in the unidirectional brake tread 814. This is better illustrated with reference to FIG. 9. Thus, when the unidirectional brake 818 is engaged, the angled brake pad fits into the angled groove of the unidirectional brake tread 814 and brakes the fixed axis wheel 808, which, in turn, brakes the sphere 802. Due to the slope of the angled brake pad and the corresponding unidirectional brake tread 814, the fixed axis wheel 808 is stopped in one direction, but allowed to move in the opposite direction.

Thus, advantageously, the sphere 802 can be made to stop in one direction while allow movement in the opposite direction. This could be used to simulate a barrier in the virtual space. For example, when the user approaches a "wall" or other "barrier" in the virtual space, the sphere 802 is made to stop once the user has approached the barrier. The user can not then move the sphere to walk through the barrier. Thus, the user "feels" the barrier as pressure on the user's chest as the restraining harness holds the user on the z-axis when the user attempts to walk. However, once the user "backs up", the unidirectional brake disengages. Thus, the user could "back up" with the unidirectional brake 818 engaged, since the unidirectional brake 818 will allow the sphere 802 to rotate in the direction that is translated into movement of the user away from the barrier. This is a departure from a conventional virtual reality system wherein a user can walk right through barriers and can not "feel" a barrier.

As shown, both the bidirectional brake 816 and the unidirectional brake 818 are both clamp type brakes that are clamped down onto both sides of the fixed axis wheel 808. The bidirectional brake pad engages the caster tread 812 of the fixed axis wheel 808 itself, while the unidirectional brake pad engages a specially formed unidirectional brake tread 814.

The virtual reality processor would determine which of the brakes to engage on which of the fixed axis wheels 808 in order to simulate the barrier. More than one fixed axis wheel 808 could be stopped if the user is "walking" at an angle between the location of the fixed axis wheels.

Alternatively, other types of brake systems may be used, such as a brake system that applies pressure directly to the sphere 802 itself.

Figure 9:
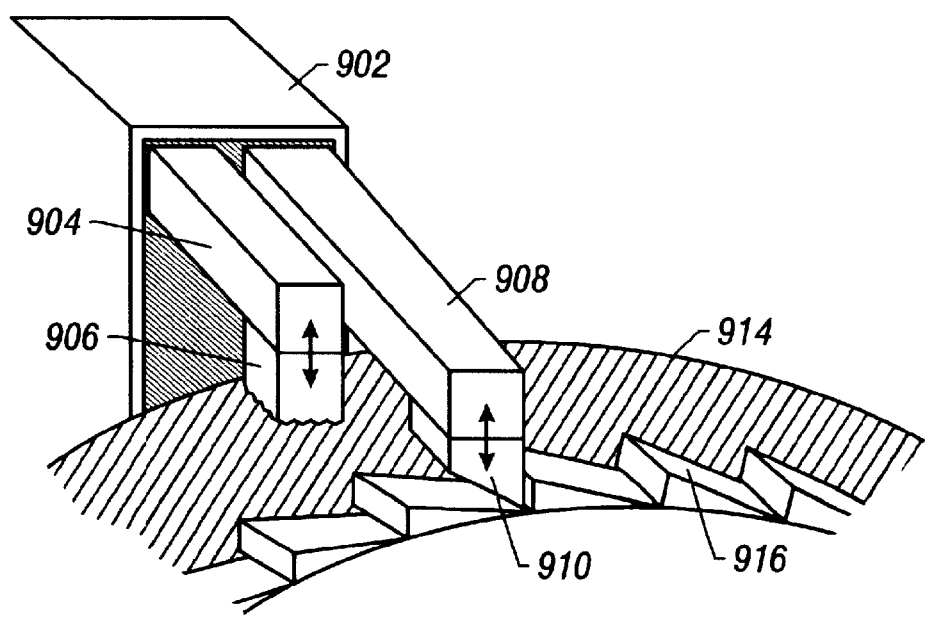
FIG. 9 is an exploded view of the brake system of FIG. 8 illustrating a close up view of the bidirectional brake and the unidirectional brake, as well as a caster tread and a unidirectional brake tread.

Referring next to FIG. 9, an exploded view is shown of the brake system illustrating a close up view of the bidirectional brake and the unidirectional brake, as well as the caster tread and unidirectional brake track shown in the embodiment of FIG. 8. Shown are the brake arm 902, bidirectional brake clamp 904, bidirectional brake pad 906, unidirectional brake clamp 908, unidirectional brake pad 910, fixed axis wheel 912, caster tread 914, and unidirectional brake tread 916. As described above, once activated the bidirectional brake pad 906 of the bidirectional brake clamp 904 engages the caster tread 914 of the fixed axis wheel 912 in order to stop (or resist) motion of the sphere in the direction of the fixed axis wheel 912.

When the unidirectional brake clamp 908 is activated, the unidirectional brake pad 910 engages the unidirectional brake tread 916. The unidirectional brake tread 916 is a series of angled grooves resembling a saw tooth. Thus, in one portion, the slope of the tooth decreases gradually until it meets the edge (or "tooth"). At the top of the tooth, the gradually decreasing slope is resumed until the next edge (or "tooth") is encountered. The unidirectional brake pad 910 has an angled shape that is designed to fit up against the edge of the unidirectional brake tread 916 at respective edges. Thus, the fixed axis wheel 912 can not move in one direction, yet can be moved in the other direction. Again, the processing equipment, e.g. virtual reality processor, must determine which of the brakes (bidirectional or unidirectional) to engage on which of the fixed axis wheels 912 located about the sphere.

Figure 10:
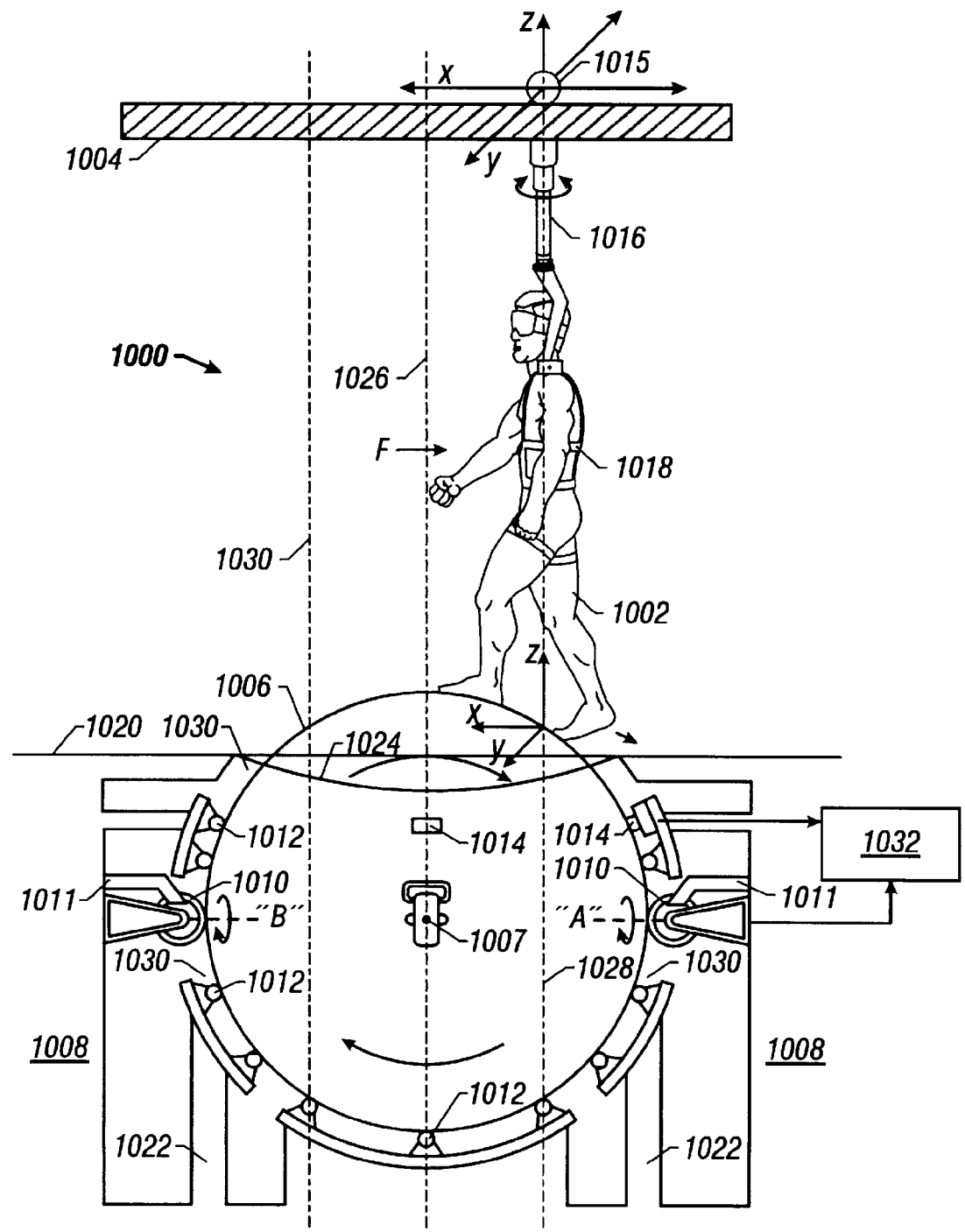
FIG. 10 is a side view of one embodiment of the apparatus shown in FIGS. 1A and 1B, such that the user is moved off of the top center of the spherical treadmill while still being held vertically on the z-axis in order to simulate uphill and downhill movement.

Referring next to FIG. 10, a side view is shown of one embodiment of the apparatus shown in FIGS. 1A and 1B, such that the user is moved off of the top center of the sphere while still being held vertically on the z-axis in order to simulate uphill and downhill movement. The virtual reality system 1000 includes the user 1002, the stand 1004, sphere 1006, center 1007, base support 1008, base support stands 1022, rotating axis wheels 1010, brake system 1011, casters 1012, motion sensors 1014, moveable support unit 1015, user support 1016, restraining harness 1018, the floor level 1020, floor opening 1024, low friction interface 1030, and virtual reality processor 1032.

The system shown in FIG. 10 is similar in operation to that shown in FIGS. 1A and 1B, and may also be configured as shown in FIG. 1C. However, this embodiment of the present invention allows the user 1002 to moved off of the original z-axis (shown as reference numeral 1026) through the center 1007 of the sphere 1006 to a new z'-axis (shown as reference numeral 1028) which a is offset (in the x direction and/or the y direction) from the top of the sphere 1006 (i.e. the top pole or the "north" pole) by a moveable support unit 1015 (see FIG. 11 for more details). The new z'-axis is a vertical axis that does not pass through the center 1007 of the sphere 1006, but passes through another portion of the sphere 1006 and is normal to the horizon. The user 1002 is then held into place on the z'-axis in order to simulate uphill and downhill motion. For example, as illustrated in FIG. 10, if the user is moved to z'-axis 1028, uphill motion will be simulated for the user. Note that due to the curvature of the sphere 1006, the user actually will be walking uphill.

There are several key features that enable the use of this embodiment of the present invention. The brake system 1011 on each rotating axis wheel 1010, and more particularly, the unidirectional brake and the bidirectional brake shown in FIGS. 8 and 9 are used. This is so that if the user is standing in position on the z'-axis 1028 (i.e. a vertical axis passing though the sphere 1006), the mass of the user 1002 on the slope of the sphere 1006 will not cause the sphere 1006 to rotate. For example, if the user is positioned along the z'-axis 1028, the bidirectional brakes are engaged on the rotating axis wheels 1010 located "behind" the user. The bidirectional brakes apply enough pressure to the rotating axis wheels 1010 so that the center of mass of the user on the surface of the sphere 1006 will not cause the sphere 1006 itself to slide down or roll backwards with relation to the user. This sliding due to the mass of the user on the downward slope of the sphere 1006 would cause the sphere to rotate, which the motion sensors 1014 would detect, and the virtual reality system would "think" that the user is walking, when in reality, the user is not. Therefore, the bidirectional brake applies enough pressure to counteract the movement of the sphere 1006 due to the mass of the user 1002 on the side of the sphere and the force of gravity. The virtual reality processor can determine the correct amount of pressure to apply with the brake system 1011 of the appropriate rotating axis wheels 1010 by using the mass of the user 1002 and the location of the user away from the top (i.e. the "north" pole) of the sphere 1006. When the user begins to take a step, the additional force, produced by the user as the user's back foot "pushes" off of the sphere 1006, since the user is held along the z'-axis 1028 by the user support 1016, overcomes the counteracting force of the bidirectional brake and causes the sphere 1006 to move. Therefore, desired movement is allowed. In operation, the user 1002 must exert a little more force than if walking "level" on the original z-axis 1026 to overcome the counteracting force provided by the bidirectional brake, creating a more realistic uphill trek. If, however, the unidirectional brake were applied to keep a user that is standing still in place, when the user tries to step, the unidirectional brake completely prevents the sphere 1006 from turning, and thus, the user 1002 could not "walk" uphill in the virtual reality world.

If the user 1002 were positioned on the z'-axis 1030 walking "downhill", then the unidirectional brake of the brake system 1011 on the rotating axis wheels 1010 in front of the user are engaged. Thus, the unidirectional brake prevents the sphere 1006 from rotating forward, with respect to the user facing down the slope of the sphere 1006, due to the mass of the user on the downward slope of the sphere. When the user begins to walk, the back foot essentially "pulls" the sphere 1006 backwards (up) in order to simulate forward motion of the user downhill. The sphere is not prevented by the unidirectional brake of the brake system 1011 from moving or rolling in the direction away from the unidirectional brake. Alternatively, the bidirectional brake may be used in place of the unidirectional brake. This would allow the user to face downhill and walk backwards uphill; however, the user 1002 must apply enough pressure to the sphere 1006 when walking to overcome the counteracting force created by the bidirectional brake as applied to the sphere.

Generally, the shoulder orientation sensor (discussed with reference to FIG. 5) is used to detect which way the user is facing; thus, the virtual reality processor can determine whether the user is walking forward or backward on the incline. Another way the virtual reality processor may be able to account for backward vs. forward motion would be to use pressure sensors, such as piezoelectric disks, placed at the interior surface of the chest plate 720 and the back piece 706 of the upper restraining harness. A change of force on the pressure from high pressure at the chest and low pressure at the back to low pressure at the chest and high pressure at the back would indicate that the user is walking backwards, or in reverse. If the user is walking "uphill" either forward or reverse, the bidirectional brakes are applied as described. If the user is walking "downhill" either forward or reverse, then the unidirectional brakes are applied as described. Thus, the pressure sensors are used to coordinate the when the brake are engaged and disengaged and how much how much force to apply (in the case of the bidirectional brake.

Furthermore, the virtual reality processor determines which direction the user is walking with the shoulder orientation sensor as described in FIG. 5.

The rotating axis wheels 1010 are different from the fixed axis wheels of the embodiments shown in FIGS. 1A and 1B in that the rotating axis wheels 1010 are allowed to rotate about the axis normal to contact with the surface of the sphere 1006 (indicated by arrows A and B in FIG. 10). The rotating axis wheels 1010 must make contact with the exterior surface of the sphere 1006, such that when the unidirectional brakes and the bidirectional brakes of the brake system 1011 are applied, the sphere 1006 will resist movement, since the rotating axis wheels 1010 will resist movement. The rotating axis wheels 1010 are located at the equator of the sphere 1006, or the horizontal midpoint of the sphere. FIG. 10 shows only 4 rotating axis wheels 1010; however, typically there is 6 rotating axis wheels 1010. The 6 rotating axis wheels 1010 are evenly spaced so that, advantageously, when the brake system 1011 is engaged, more than one bidirectional and/or unidirectional brake may be used to prevent the sphere from rotating under the weight of the user alone on the slope of the sphere 1006. This is important, since the user may not be oriented or facing directly in front of one of the rotating axis wheels 1010 (due to the freedom of movement allowed in the present embodiment). For example, the user may be one z'-axis while facing off the center of the nearest rotating axis wheel 1010, or at a distance in between the two nearest rotating axis wheels 1010 (in a system having four rotating axis wheels spaced at 90 degrees apart). The brake system 1011 on one rotating axis wheel 1010 would engage; however, the sphere 1006 may tend to rotate slightly away from the center of the rotating axis wheel, translating into unintentional movement of the sphere or error in the virtual reality simulation. Advantageously, if more than 4 rotating axis wheels 1010 are used, the two brake systems 1011 may be engaged, one on each of two rotating axis wheels 1010 on either side in front of the user.

The rotating axis wheels 1010 are designed to rotate, so that when the user 1002 is off of the center of the sphere 1006 on a z'-axis, the rotating axis wheels 1010 can physically rotate slightly to be in line with the motion of the sphere as much as possible. However, the rotating axis wheels 1010 should not be allowed to rotate as much as 90 degrees from the vertical. If the rotating axis wheels were allowed to rotate 90 degrees, the rotating axis wheel 1010 would not reduce any unintentional spinning about the z-axis, and would actually resist some of the desired motion vertically through the equator of the sphere. Thus, the rotating axis wheels 1010 are preferably limited in their rotation to less than 90 degrees in either direction from the original vertical orientation, preferably limited to less than 45 degrees rotation from the vertical. This rotation minimizes any cross resistance of movement across the side of a similar fixed axis wheel since the user is now moved off of the original z-axis passing through the center of the sphere.

Additionally, it should be apparent that the brake systems 1011 attached to each rotating axis wheel must rotate with along the rotating axis wheel.

The same low friction interface 1030 is formed as in the embodiments described earlier; however, there is more friction created in this embodiment than in an embodiment without braking features, due to the contact between the rotating axis wheels 1010 and the exterior surface of the sphere 1006; however, since the wheels may rotate about the axis normal to the contact with the surface of the sphere 1006, the friction may be minimized. Since the rotating axis wheels 1010 can rotate and are located at the equator of the sphere 1006, movement of the sphere will be mostly up and down (vertical) with respect to the rotating axis wheels 1010 (with little or no movement across the rotating axis wheels 1010), except for the rotating axis wheels 1010 that are located at about 90 degree angles from the motion of the sphere 1006. The direction of movement of the sphere 1006 will have a spinning effect on the rotating axis wheels 1010 located at approximately 90 degree angles from the motion of the sphere. The resistance due to this spinning effect is minimized since only a very small portion of the rotating axis wheels contact the actual surface of the sphere; thus, the sphere 1006 is able to easily spin about the rotating axis wheels 1010 located at 90 degrees from the movement of the sphere.

Alternatively, instead of using rotating axis wheels 1010 as described above, fixed axis wheels may be used; however, it is important that the entire fixed access wheel is allowed to move along the interior of the base support to be inline with the axis perpendicular to the axis formed that passed through the center of mass of the user 1002 on the new z-axis (e.g. z-axis 1028) and the center of the sphere 1006. Thus, as the user is moved off of the vertical axis passing through the center of the sphere 1006 (i.e. z-axis 1026), the fixed axis wheels will have to be physically moved to another location contacting the exterior surface of the sphere 1006 (i.e. moved away from the equator of the sphere 1006). Such a location is determined by the axis normal or perpendicular to the axis formed that passes from the center of mass of the user 1002 on the new z-axis (i.e. z-axis 1028) to the center of the sphere 1006. Moving the fixed axis wheels could be accomplished with the use of motors synchronized with the moveable support unit 1015. These motors would move the fixed axis wheels vertically up and down, e.g. on a track, to the desired position at the exterior of the sphere 1006. However, it is preferable to simply allow for the fixed axis wheels to rotate (i.e. become rotating axis wheels 1010) than the physically move them to other locations at the exterior of the sphere 1006.

Alternatively, as described in the embodiments of FIGS. 1A and 1B, the rotating axis wheels 1010 may be motorized, or at least coupled to a motor, such that the sphere may be physically moved in a desired direction by the motors. This could be used to simulate a faster motion or as part of an "exercise mode" as described earlier, for example.

Again, the motion sensors 1014 detect direction and velocity of the movement of the sphere, similar to "mouse" sensors, and this motion is translated into direction and velocity of the user so that the virtual reality processing equipment can simulate movement of the user correctly within the virtual space created. The computer knows exactly at what location on the top exterior of the sphere the user is, since the computer controls the location of the user, via the user support (see FIG. 11), on the sphere.

Figure 11:
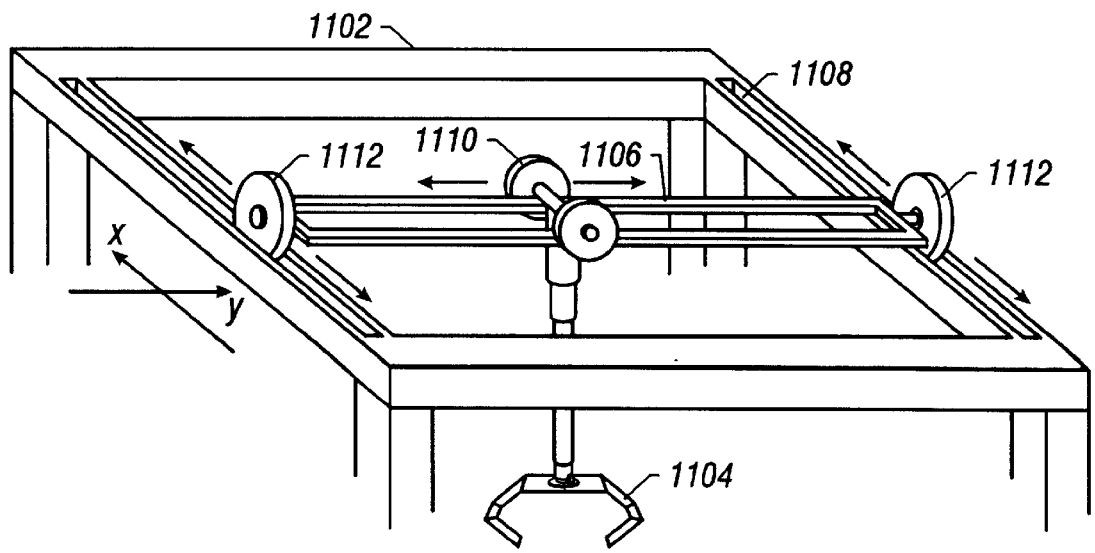
FIG. 11 is a moveable support unit for use in the embodiment shown in FIG. 10 wherein the user support is moved in both x and y directions in order to move the user off of the top center of the spherical treadmill while still being held on the z-axis.

Referring next to FIG. 11, a moveable support unit is shown for use in the embodiment shown in FIG. 10 wherein the user support is moved in both x and y directions in order to move the user off of the top center of the sphere while still being held on the z-axis. Shown are the stand 1102, user support 1104, support bar 1106, grooves 1108, x controller 1112, and y controller 1110.

The apparatus shown in FIG. 11 is used to move the user off of the center of the top of the sphere. The user support 1104 is mounted to a support bar 1106 which attaches to an x controller 1112 on either side of the stand 1102. Each x controller 1112 is a motorized wheel, for example, that moves along a groove 1108 or track in the stand 1102. Both x controllers 1112 move together to move the support bar 1106 in the x direction over the sphere. The support bar 1106 also has a y controller 1110, which is two motorized wheels, that move the user support 1104 in the y direction across the support bar 1106 and; thus, in the y direction over the top of the sphere. The combination of the x controllers 1112 and the y controller 1110 moves the user in both x and y directions off of the top center of the sphere to a desired point on the top surface of the sphere. The virtual reality processor sends control signals to the x controllers and the y controller 1110 to physically move the user support 1104, on which the user is attached, to the new z'-axis. Once in position, the x controller 1112 and the y controller 1110 lock into place such that the user is held on the new z'-axis and only moved to another z'-axis as the virtual reality processor determines.

As is apparent to the skilled artist, there may be many different ways in which to accomplish the function of moving the user off of the original z-axis, such as the above description; however, the present invention is not limited to the above description. Other devices known in the art may be used.

Figure 12:
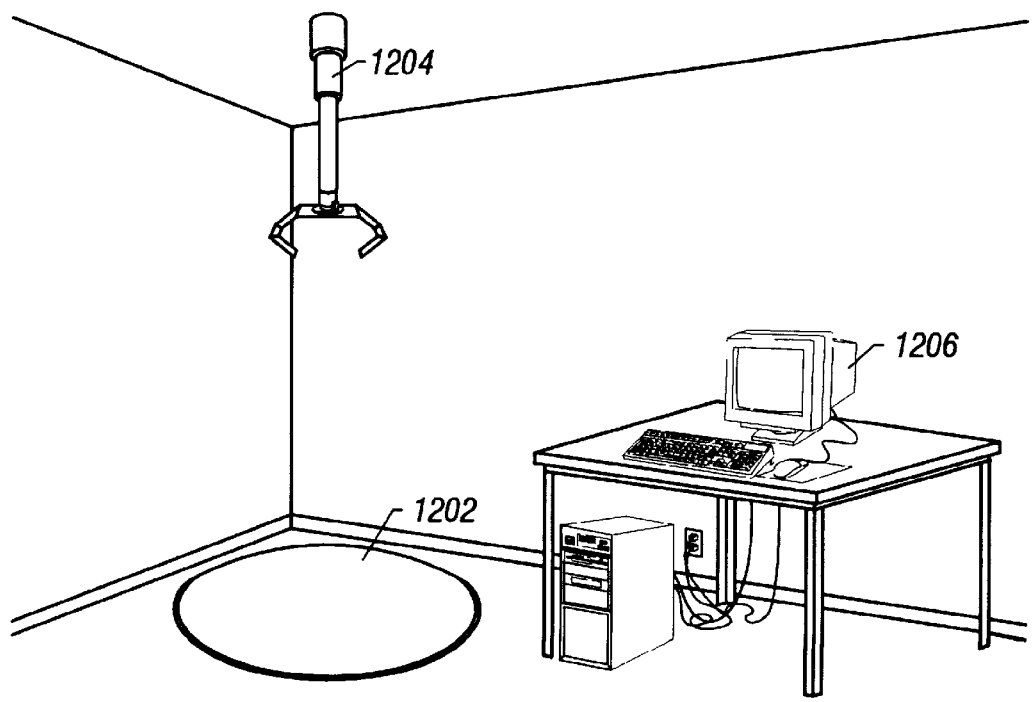
FIG. 12 is a view of the apparatus shown in FIG. 1A and 1B having been built into a floor with a corresponding user support rigidly attached to a ceiling, illustrating special requirements of a virtual reality system.

Referring next to FIG. 12, a view is shown of the apparatus shown having been built into a floor with the corresponding user support rigidly attached to the ceiling, illustrating the special requirements of the virtual reality system. Shown are the sphere 1202, user support 1204, and computer 1206 located within a small room. Advantageously, this departs from prior art systems, such as the 134 patent, that requires a tremendous amount of physical space for implementation. Assuming that there is adequate space underneath a floor to house the sphere 1202 and base support, the virtual reality system can be installed into a small amount of physical space, as seen by the user. This would enable installation within a home or office space. The user support 1204 is rigidly attached to the ceiling support, and therefore, a stand is not needed. The computer 1206 houses the virtual reality processor and has input/output lines to the various devices of the virtual reality system.

Figure 13:
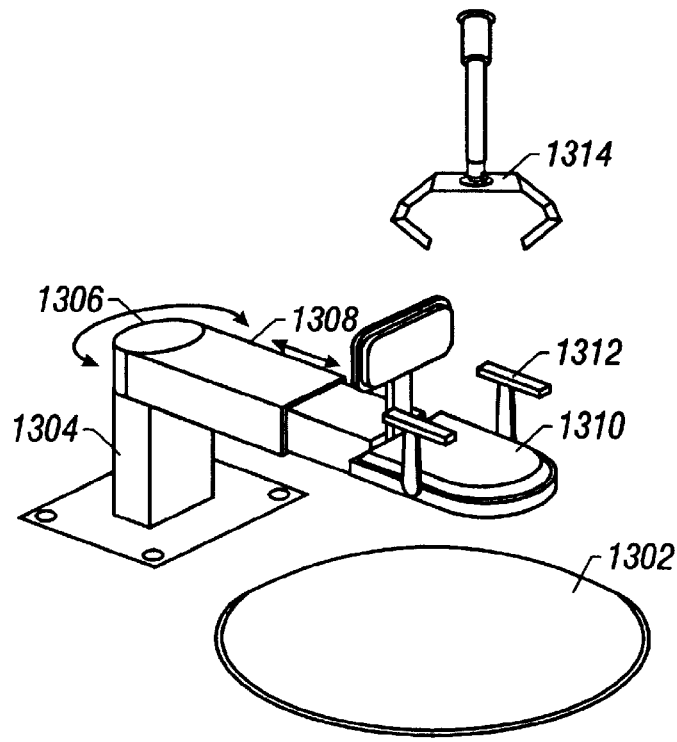
FIG. 13 is a diagram of an embodiment of the present invention including a chair in which the user can sit during immersion of the user into a virtual reality.

Referring next to FIG. 13, a diagram is shown of an embodiment of the present invention including a chair for the user to sit in during immersion of the user into a virtual reality. Shown is the sphere 1302, chair support 1304, chair swivel joint 1306, chair arm 1308, chair 1310, input/output devices 1312, and the user support 1314.

In this embodiment of the present invention, a chair 1310 is provided that can be moved into position so that the user may be able to sit down during the virtual reality simulation. For example, there may be an occasion for the user to sit down at a "virtual desk".

The chair support 1304 is rigidly attached to the floor or base support. A chair swivel joint 1306 may be provided so that the chair 1310 may be swung around to be placed into position and then later put back away. A motor may be used to control the chair swivel joint 1306. Further, a chair arm 1308 connects the chair 1310 to the chair swivel joint 1306. The chair arm 1308 may be made to extend the chair 1310 toward and away from the user, so that the chair 1310 may simply be positioned directly under the user at the appropriate time. Again, the motion of the chair arm 1308 may be controlled through the use of a motor, such that the chair 1310 moves in and out in a telescoping manner. Alternatively, the user could simply reach behind and pull the chair directly underneath. The chair support 1304, chair swivel joint 1306, and chair arm 1308 should be made of a very rigid, strong material that will be able to support the weight of the user extended out over the center of the sphere from the chair support 1304.

The chair 1310 may also have input/output devices 1312, such as keyboards, game controllers, etc., for user interaction with the virtual reality system. Note that the user support 1314 must allow for enough vertical movement along the z-axis to allow the user (attached to the user support 1314) to be lowered enough to comfortably sit in the chair 1310. There may be many alternative ways in which the skilled artist could bring a chair 1310 into position underneath the user. For example, the chair may be mounted to the stand of the virtual reality system and swung down into position.

Figure 14:
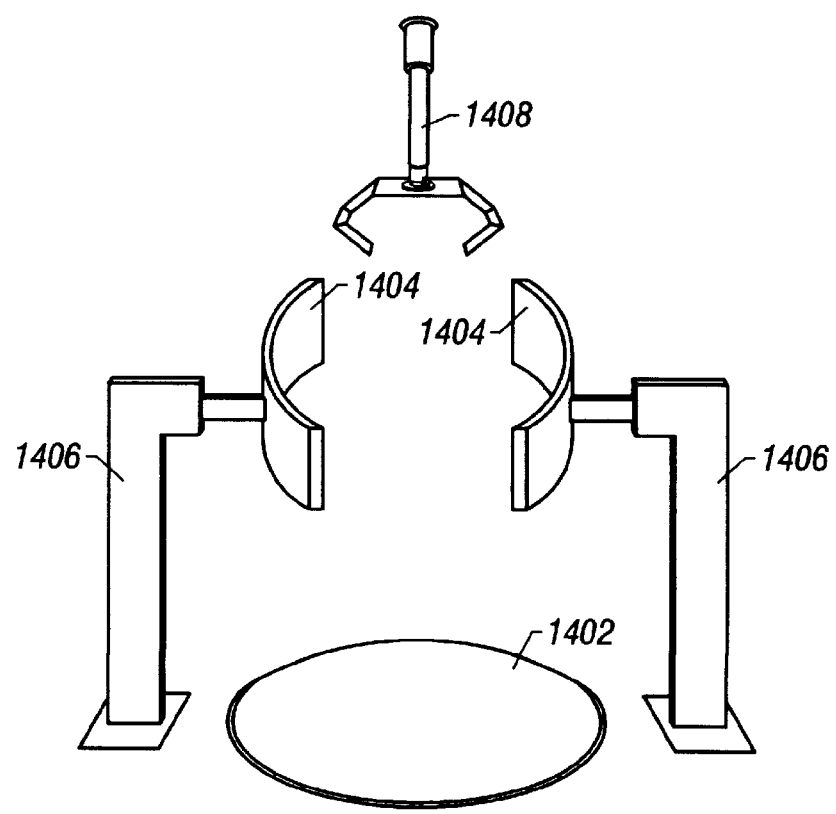
FIG. 14 is an apparatus for bringing the user into contact with interactive touch pads or other sensory devices of the virtual reality system.

Referring next to FIG. 14, another embodiment of the present invention is shown of an apparatus for bringing the user into contact with interactive touch pads or other features of the virtual reality system. Shown are the sphere 1402, touch pads 1404, extendable support arms 1406, and the user support 1408. The touch pads 1404 are simply input/output devices that the enable the user to touch objects within the virtual reality, typically with contact gloves, as known in the art. The touch pads 1404 may be extended into reach of the user or retracted away from the user by the extendable support arms 1406. Alternatively, the touch pads 1404 could be any other input/output devices, such as keyboards, controllers, etc., known in the art.

While the invention herein disclosed has been described by means of specific embodiments and applications thereof, numerous modifications and variations could be made thereto by those skilled in the art without departing from the scope of the invention set forth in the claims.

What is claimed is:

1. An input system for a virtual reality application comprising:

a sphere having a center and an exterior surface;

a base support supporting the sphere on the base support;

a low friction interface formed between the base support and a portion of the exterior surface of the sphere, wherein the low friction interface generally conforms to the portion of the exterior surface of the sphere and permits rotation of the sphere about the center of the sphere relative to the base support;

a user support for supporting a user on the exterior surface of the sphere and for holding a center of mass of the user on a vertical axis passing through the sphere, wherein the user support is rigidly secured above the sphere; and one or more sensors coupled to the base support for detecting and measuring a movement of the sphere.

2. The system of claim 1 further comprising a plurality of wheels attached to said base support, wherein the plurality of wheels contact said sphere.

3. The system of claim 2 wherein said plurality of wheels comprises a plurality of fixed axis wheels.

4. The system of claim 2 wherein said plurality of wheels comprises a plurality of rotating axis wheels.

5. The system of claim 1 wherein said sphere is a hollow sphere having said exterior surface and an interior surface.

6. The system of claim 1 wherein said sphere is an inflatable sphere.

7. The system of claim 6 wherein said inflatable sphere is a vinyl inflatable sphere and is inflated at a minimum of 0.5 atmospheres.

8. The system of claim 1 wherein said one or more sensors comprise one or more mouse type sensors.

9. The system of claim 1 wherein said user support is adapted to hold said center of mass of said user on said vertical axis passing through said center of said sphere.

10. The system of claim 1 wherein said user support is rigid and does not rotate about said vertical axis passing through said sphere.

11. The system of claim 10 further comprising:

an upper restraining harness rotatably attached to said user support, wherein the upper restraining harness rotates about said vertical axis passing through said sphere, wherein the upper restraining harness is adapted to hold an upper torso of said user on said vertical axis passing through said sphere; and a lower restraining harness attached to the upper restraining harness for holding a lower torso of said user.

12. The system of claim 1 wherein said user support comprises a moveable user support, wherein the moveable user support is for positioning said user at different locations above said sphere, whereby moving the user to respective ones of a plurality of vertical axes passing through said sphere.

13. The system of claim 12 further comprising one or more motors attached to said moveable user support for moving said moveable user support to different locations above said sphere.

14. The system of claim 13 wherein said one or more motors move said moveable user support along an x-axis and a y-axis, wherein the x-axis and the y-axis are perpendicular to said vertical axis passing though said sphere.

15. The system of claim 1 further comprising a chair attached to said base support, wherein the chair is moved into position to allow said user to sit.

16. The system of claim 1 further comprising one or more brakes coupled to said base support for braking the movement of said sphere.

17. The system of claim 14 wherein said one or more brakes comprise one or more unidirectional brakes, wherein the one or more unidirectional brakes engage respective ones of a plurality of wheels, wherein each of the plurality of wheels is attached to said base support and contacts said sphere, wherein each of the one or more unidirectional brakes causes the respective ones of the plurality of wheels to brake which causes said sphere to brake.

18. The system of claim 16 wherein said one or more brakes comprise one or more bidirectional brakes.

19. The system of claim 18 wherein said one or more bidirectional brakes engage a caster tread of respective ones of a plurality of wheels, wherein the respective ones of the plurality of wheels are in contact with said sphere.

20. The system of claim 16 wherein said one or more brakes comprise one or more unidirectional brakes.

21. The system of claim 20 further comprising a unidirectional brake tread coupled to respective ones of a plurality of wheels, wherein the respective ones of the plurality of wheels contact said sphere, wherein the unidirectional brake tread is adapted to engage one of said one or more unidirectional brakes.

22. The system of claim 1 further comprising:

a rotatable joint attached to one end of said user support; and a restraining harness attached to the rotatable joint for holding said center of mass of said user on said vertical axis passing through said sphere, wherein said restraining harness rotates about said vertical axis passing through said sphere, wherein said user support can not rotate about said vertical axis passing through said sphere.

23. The system of claim 22 wherein said user support comprises a telescoping user support, wherein the telescoping user support telescopes along said vertical axis passing through said sphere.

24. The system of claim 1 further comprising a stand attached to said base support and said user support.

25. The system of claim 1 wherein said low friction interface comprises a plurality of casters attached to said base support for supporting said sphere on said base support, wherein each of the plurality of casters contact said exterior surface of said sphere and permit rotation of said sphere about said center of said sphere.

26. An input system for a virtual reality application comprising:

a sphere having a center and an exterior surface;

support means including rotation means supporting the sphere, wherein the rotation means contact the exterior surface of the sphere and permit rotation of the sphere about the center;

user support means rigidly secured above the sphere for supporting a user on the exterior surface of the sphere, wherein the user support means is for holding a center of mass of the user on a vertical axis passing through the sphere; and sensor means coupled to the support means for detecting and measuring a movement of the sphere.

27. A method of providing a virtual reality input comprising:

providing a sphere having a center and an exterior surface;

providing a base support for supporting the sphere on the base support;

providing a low friction interface formed between the base support and the exterior surface of the sphere, wherein the low friction interface generally conforms to a portion of the exterior surface of the sphere and permits rotation of the sphere about the center of the sphere relative to the base support;

positioning a user above the exterior of the sphere such that the user stands upon the exterior of the sphere;

supporting the user above the exterior of the sphere;

maintaining a center of mass of the user on a vertical axis passing through the sphere, whereby preventing the user from moving off of the vertical axis;

rotating the sphere in reaction to movements of the user;

detecting the movement of the sphere; and measuring the movement of the sphere.

28. The method of claim 27 wherein said maintaining comprises maintaining said user on said vertical axis passing through said center of said sphere.

\* \* \* \* \*